(12) United States Patent
Yatagai et al.

(10) Patent No.: US 7,699,341 B2
(45) Date of Patent: *Apr. 20, 2010

(54) PLANING BOAT WITH AIRBAG SYSTEM

(75) Inventors: Yasuaki Yatagai, Hamamatsu (JP); Takashi Shimizu, Hamamatsu (JP); Koji Kurata, Hamamatsu (JP)

(73) Assignee: Suzuki Kabushiki Kaisha, Hamamatsu-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/963,333

(22) Filed: Dec. 21, 2007

(65) Prior Publication Data

US 2008/0111350 A1   May 15, 2008

Related U.S. Application Data

(63) Continuation of application No. 11/108,667, filed on Apr. 19, 2005, now Pat. No. 7,350,802.

(30) Foreign Application Priority Data

Apr. 20, 2004   (JP) .............................. 2004-124301

(51) Int. Cl.
  *B60R 21/16*   (2006.01)
  *B60R 21/20*   (2006.01)
  *B60R 21/203*  (2006.01)

(52) U.S. Cl. ................. 280/730.1; 280/728.2; 280/748; 280/752

(58) Field of Classification Search ............... 280/728.1, 280/728.2, 730.1, 743, 748, 751, 752, 753
See application file for complete search history.

(56) References Cited

U.S. PATENT DOCUMENTS 5,072,966 A    12/1991   Nishitake et al.
5,149,127 A *  9/1992   Manabe et al. .............. 280/731

(Continued)

FOREIGN PATENT DOCUMENTS

JP    7-108985    4/1995

(Continued)

OTHER PUBLICATIONS

U.S. Appl. No. 11/963,377, filed Dec. 21, 2007, Yatagai, et al.

*Primary Examiner*—Paul N. Dickson
*Assistant Examiner*—Barry Gooden, Jr.
(74) *Attorney, Agent, or Firm*—Oblon, Spivak, McClelland, Maier & Neustadt, L.L.P.

(57) ABSTRACT

A planing boat, particularly of a small size, is provided with an airbag system. The airbag system includes at least one bag-shaped airbag body, a housing which accommodates the airbag body, a detector for detecting a collision of the boat, an expanding unit which inflates the airbag body at the time of collision of the boat, and a controller for controlling the detector and the inflation of the airbag body. In a preferred embodiment, the airbag system includes a first airbag body in the handle cover which is blown up from the handle bar to a rear side of the boat and a second airbag body in the handle cover which is blown up toward a front side of knees of a rider.

10 Claims, 19 Drawing Sheets

U.S. PATENT DOCUMENTS

| | | | |
|---|---|---|---|
| 5,197,759 A * | 3/1993 | Kroiss et al. | 280/736 |
| 5,472,230 A | 12/1995 | Every et al. | |
| 5,717,811 A * | 2/1998 | Macken | 385/135 |
| 5,868,422 A * | 2/1999 | Galbraith et al. | 280/732 |
| 6,070,546 A * | 6/2000 | Downey et al. | 114/123 |
| 6,347,970 B1 * | 2/2002 | Weinel | 441/80 |
| 6,773,028 B2 * | 8/2004 | Itabashi et al. | 280/730.1 |
| 7,044,499 B2 | 5/2006 | Miyata et al. | |
| 7,213,831 B2 * | 5/2007 | Miyata | 280/728.2 |
| 2003/0015861 A1 | 1/2003 | Abe | |
| 2003/0116945 A1 | 6/2003 | Abe | |
| 2003/0164258 A1 | 9/2003 | Lalonde et al. | |
| 2003/0218317 A1 | 11/2003 | Yamazaki et al. | |
| 2004/0182629 A1 | 9/2004 | Takahashi et al. | |
| 2004/0256848 A1 | 12/2004 | Miyata et al. | |
| 2005/0127646 A1 | 6/2005 | Kobayashi | |
| 2005/0236817 A1 | 10/2005 | Sonoda et al. | |

FOREIGN PATENT DOCUMENTS

| | | |
|---|---|---|
| JP | 9-66789 | 3/1997 |
| JP | 2001-219884 | 8/2001 |
| JP | 2001-233267 | 8/2001 |
| JP | 2002-137777 | 5/2002 |
| JP | 2003-11871 | 1/2003 |
| JP | 2003-285787 | 10/2003 |

* cited by examiner

PLANING BOAT WITH AIRBAG SYSTEM

CROSS REFERENCE TO RELATED APPLICATIONS

This application is a continuation of U.S. application Ser. No. 11/108,667, filed Apr. 19, 2005, and is based upon and claims the benefit of priority from the prior Japanese Patent Application No. 2004-124301 filed on Apr. 20, 2004, the entire contents of each of which are incorporated herein by reference.

BACKGROUND OF THE INVENTION

1. Field of the Invention

The present invention relates to a planing boat, particularly of small type, equipped with an airbag system.

2. Related Art

Recently, it is general for a four-wheel car to be provided with an airbag system as means for relaxing an impact on riders in a collision.

The airbag systems for four-wheel cars are based on the premise of using with a seatbelt and used for relaxing an impact on the riders in a car collision, and the seatbelt is for absorbing a force that throws the riders forwards.

As marine sports become popular, a collision between small planing boats such as motor boats and wet bikes (or personal watercrafts) increases. Accordingly, airbag systems for relaxing the impact on the riders at a boat collision have been researched and developed to be mounted.

An example of the airbag system provided for motor boats is disclosed in Japanese Patent Laid-open (KOKAI) Publication No. HEI 7-108985, which is equipped with an airbag on the deck obliquely behind the cockpit surrounded by a cowling, this airbag being inflated manually when the rider feels or detects danger.

Although there is no example of airbags designed specifically for a wet bike in which a cockpit is exposed to the outside, there is another similar example of a wearable airbag suitable for protecting motor-bike riders (for example, refer to Japanese Patent Laid-open Publication No. HEI 9-66789.

However, a small planing boat such as wet bike sometimes utilizes weight shift of the rider on a saddle-type driver's seat to control the operation, and in such a planing boat, no seatbelt is equipped. Accordingly, the airbag system for the four-wheel car based on the premise of utilizing the seatbelt is not suitable for such small planing boats. In addition, because of no seatbelt equipped, at a time of collision, a large force directed to the outside of the boat is applied to the rider in the small planing boat, being dangerous.

SUMMARY OF THE INVENTION

The present invention has been conceived in consideration of the defects mentioned above, and an object of the invention is to provide a planing boat, particularly of small size, equipped with an airbag system capable of relaxing an impact on an rider at a time of collision and preventing the rider from being thrown to the outside of the boat.

The above and other objects can be achieved according to the present invention by providing, in one aspect, a planing boat with an airbag system comprising:

a boat body extending in a longitudinal direction of a planing boat;

an engine mounted in the boat body;

a steering handle bar supported by a steering shaft at an upper portion of the boat body so as to be tuned to right and left;

a handle cover which covers the handle bar;

a hood which covers a front half upper surface of the boat body in front of the handle bar;

a rider driving seat disposed behind the handle bar; and an airbag system including at least one bag-shaped airbag body, a housing which accommodates the airbag body, a detector for detecting a collision of the boat, an expanding unit which inflates or blows up the airbag body at the time of collision of the boat, and a controller for controlling the detector and the inflation of the airbag body, the airbag system including a first airbag body in the handle cover which is blown up from the handle bar to a rear side of the boat and a second airbag body in the handle cover which is blown up toward a front side of knees of a rider.

In this first aspect, preferable embodiments or examples may further provide the following features.

The handle bar and the handle cover are mounted to the boat body to be detachable in a set with the housing. The steering shaft is divided axially into divided pieces which are coupled together with a joint, and a whirl-stopping member is disposed so as to stop whirl motion of the steering shaft and the joint.

The detector is mounted to the boat body to be detachable in a set with a portion of the boat body. The airbag body is colored in a color other than blue and green or coated with a fluorescent paint. The engine is a four-stroke-cycle engine.

The airbag system includes further airbag bodies which are disposed in the grips on both ends of the handle bar so as to be expanded and blown up along the width of the boat body.

The airbag system includes still further airbag bodies which are disposed in broadsides of the boat body so as to be expanded and blown up upward along the width of the boat body to cover rider's feet decks in a side view. The airbag system is switched to be operated "ON" and "OFF".

In a second aspect of the present invention, there is also provided a planing boat with an airbag system comprising:

a boat body extending in a longitudinal direction of a planing boat;

an engine mounted in the boat body;

a steering handle bar disposed at an upper portion of the boat body;

a meter panel disposed in front of the handle bar;

a hood which covers a front half upper surface of the boat body in front of the meter panel;

a frame extending along the longitudinal direction of the boat body at a bottom portion thereof;

a support frame provided in the vicinity of a distal end portion of the frame so as to extend toward a lower surface of the hood; and an airbag system including at least one bag-shaped airbag body, a housing which accommodates the airbag body, a detector for detecting a collision of the boat, an expanding unit which inflates or blows up the airbag body at the time of collision of the boat, and a controller for controlling the detector and the inflation of the airbag body, wherein the airbag body is disposed under the hood and is set so as to blow up toward the meter panel by utilizing a portion of the hood covering an upper portion of the meter panel as a guide slop.

The present invention of this second aspect may provides the following preferred embodiments or examples.

The airbag system is mounted to the boat body to be detachable in a set with portion of the boat body.

The detector is mounted to the boat body to be detachable in a set with a portion of the boat body. The detector may be mounted to be integral with the housing. The airbag body is colored in a color other than blue and green or coated with a fluorescent paint.

The engine is mounted in the boat body below the rider seat, auxiliary engine machinery including a fuel tank is disposed in front of the engine in the boat body, and the airbag body is disposed in a space above the auxiliary engine machinery. The engine is a four-stroke-cycle engine.

The frame has an end portion located between the collision detector and the housing disposed under the hood.

The airbag system includes further airbag bodies which are disposed in the grips on both ends of the handle bar so as to be expanded and blown up along the width of the boat body.

The airbag system includes still further airbag bodies which are disposed in broadsides of the boat body so as to be expanded and blown up upward along the width of the boat body to cover rider's feet decks in a side view. The airbag system is switched to be operated "ON" and "OFF".

In a third aspect of the present invention, there is also provided a planing boat with an airbag system comprising:

a boat body extending in a longitudinal direction of a planing boat;

an engine mounted in the boat body;

a steering handle bar supported by a steering shaft at an upper portion of the boat body so as to be turned to right and left;

a handle cover which covers the handle bar;

a meter panel disposed in front of the handle bar;

a hood which covers a front half upper surface of the boat body in front of the meter panel;

a frame extending along the longitudinal direction of the boat body at a bottom portion thereof;

a rider driving seat disposed behind the handle bar;

a support frame provided in the vicinity of a distal end portion of the frame so as to extend toward a lower surface of the hood; and an airbag system including at least one bag-shaped airbag body, a housing which accommodates the airbag body, a detector for detecting a collision of the boat, an expanding unit which inflates or blows up the airbag body at the time of collision of the boat, and a controller for controlling the detector and the inflation of the airbag body, wherein the airbag system including a first airbag body in the handle cover which is blown up from the handle bar to a rear side of the boat, a second airbag body in the handle cover which is blown up toward a front side of knees of a rider, and a third airbag body supported by the support frame and disposed under the hood so as to expand and inflate toward the meter panel by utilizing a portion of the hood covering the upper portion of the meter panel as a guide slop, the first, second and third airbag bodies being activated such that, depending on a degree of the collision, only the airbag body disposed in the handle cover is blown up, all the airbag bodies are blown up at the same time, or the airbag body disposed under the hood is blown up with a time lag relative to the airbag body disposed in the handle cover.

The present invention of this third aspect may be provided with the following preferred embodiments or examples.

That is, a timing of blowing up the airbag body disposed under the hood is delayed from a timing of blowing up the airbag body disposed in the handle cover, and the expanded and blown-up area of the airbag body disposed under the hood is set to be wider than that of the airbag body disposed in the handle cover.

The airbag body disposed under the hood is set to be contracted, after the blowing up thereof, at a time later than the contraction of the airbag body disposed in the handle cover, set to be hardly contracted, or set not to be contracted.

The airbag body is colored in a color other than blue and green or coated with a fluorescent paint.

The engine is mounted in the boat body below the rider seat, auxiliary engine machinery including a fuel tank is disposed in front of the engine in the boat body, and the airbag body is disposed in a space above the auxiliary engine machinery.

The airbag body disposed in the handle cover has a size along the width of the boat body, which is set to be larger than the width of the handle bar and smaller than the width of the boat body, and the airbag body disposed under the hood has a size which is set to be larger than the width of the boat body.

The steering shaft is divided axially into divided pieces which are coupled together with a joint, and a whirl-stopping member is disposed so as to stop whirl motion of the steering shaft and the joint.

The engine is a four-stroke-cycle engine.

The frame has an end portion located between the collision detector and the housing disposed under the hood.

The airbag system includes further airbag bodies which are disposed in the grips on both ends of the handle bar so as to expand and brow up along the width of the boat body. The airbag system includes still further airbag bodies which are disposed in broadsides of the boat body so as to expand and blow up upward along the width of the boat body to cover rider's feet decks in a side view. The airbag system is switched to be operated "ON" and "OFF".

According to the planing boat, particularly of small size, with an airbag system of the aspects and preferred embodiments of the present invention mentioned above, the rider can be prevented from striking against the steering handle and the meter panel and also from being thrown outside the boat. The maintenance and detachment of the airbag system from outside the boat body can be facilitated and improved as well as handling of the airbag body and/or air bag bodies, thereby facilitating restoration to traveling on its own power.

The airbag system can easily be dismounted from the boat body for storage when the planing boat is out of use. The high viewability of the airbag body from a distance can be achieved by applying specific colors or like, facilitating discovery of accident boats and rescue of riders.

The distal end of the boat body is endowed with an impact absorbing function, so that it protects the rider effectively, and the distal end of the boat body is also endowed with a waterproof function, thus preventing the inside of the boat body from invading of water even if the distal end of the boat body absorbs an impact and is deformed.

The nature and further characteristic features of the present invention will be made clear from the following descriptions with reference to the accompanying drawings.

DESCRIPTION OF THE PREFERRED EMBODIMENTS

Preferred embodiments of the present invention will be described hereunder with reference to the accompanying drawings.

Figure 1:
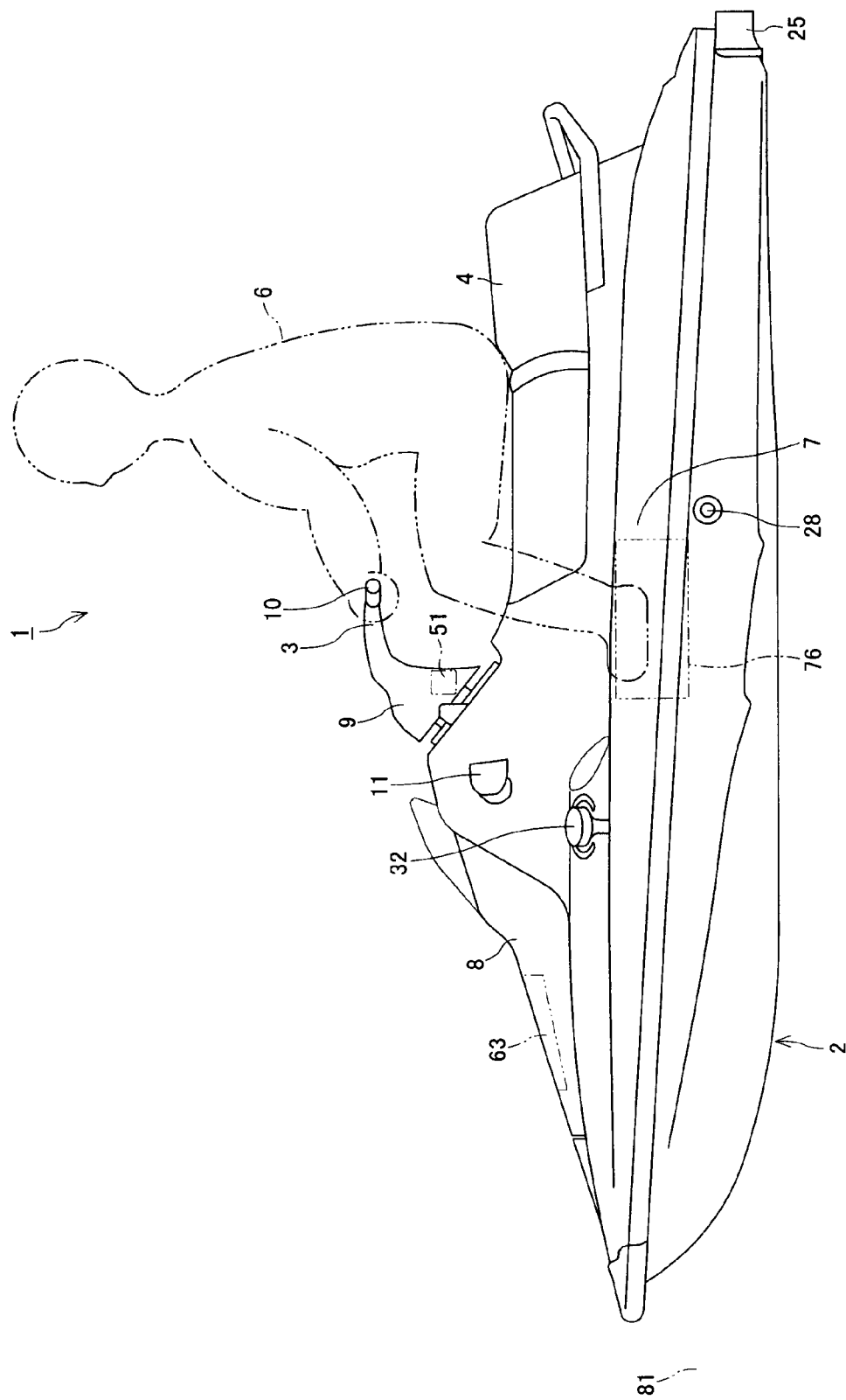
FIG. 1 is a left side view of a wet-bike type small planing boat equipped with an airbag system according to a first embodiment of the present invention.
Figure 2:
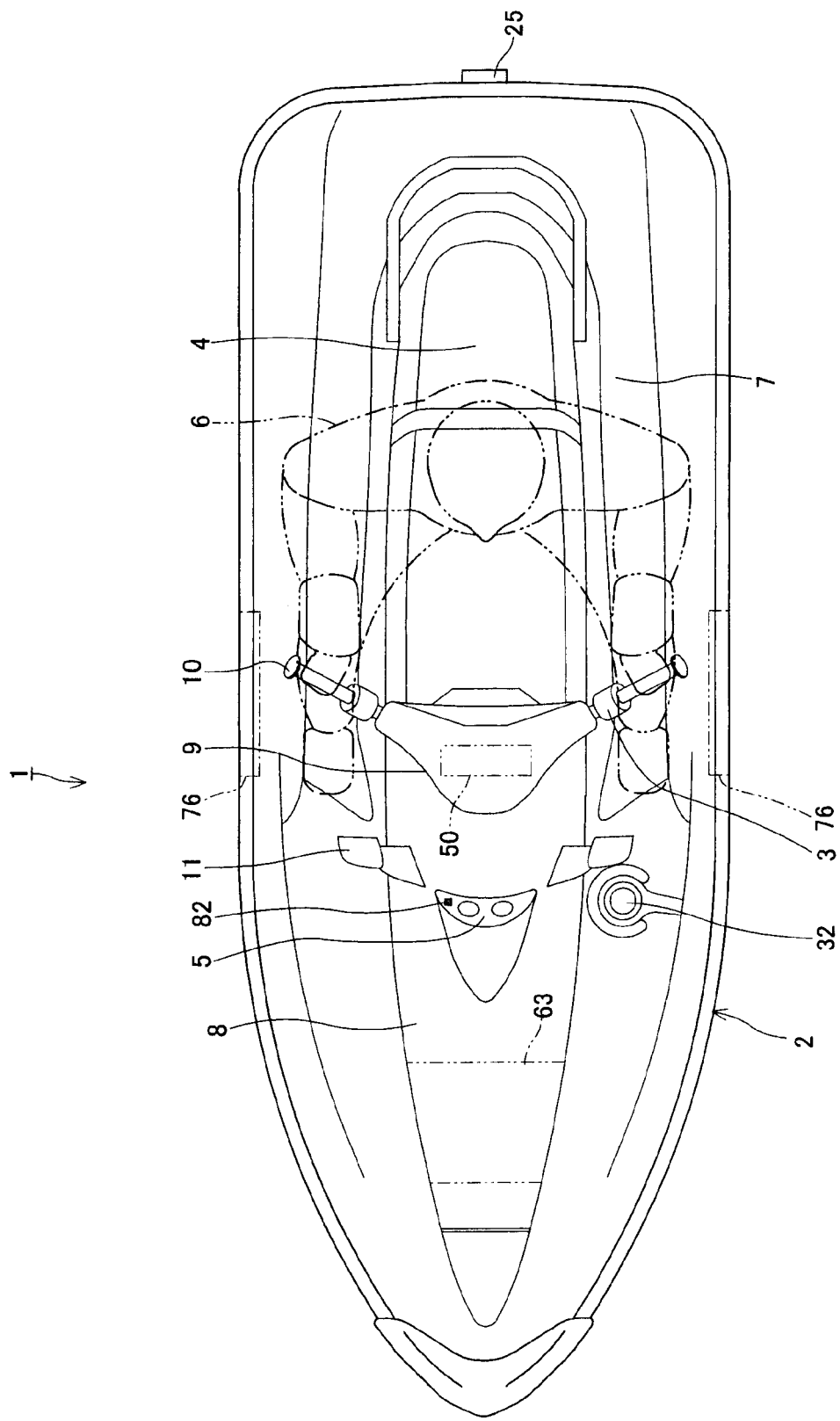
FIG. 2 is a plan view of the planing boat shown in FIG. 1.

FIGS. 1 and 2 represent the first embodiment of the present invention, and as shown in FIGS. 1 and 2, a planing boat 1, particularly of small size, includes a steering handle bar 3 at a central upper portion of a boat body 2, and a straddle type driving seat 4 for an rider 6 is disposed on the rear side of the handle bar 3. In front of the handle bar 3, a meter panel 5 is disposed. Decks 7 for the rider 6 to place his/her feet are provided on both sides of the driving seat 4.

Figure 3:
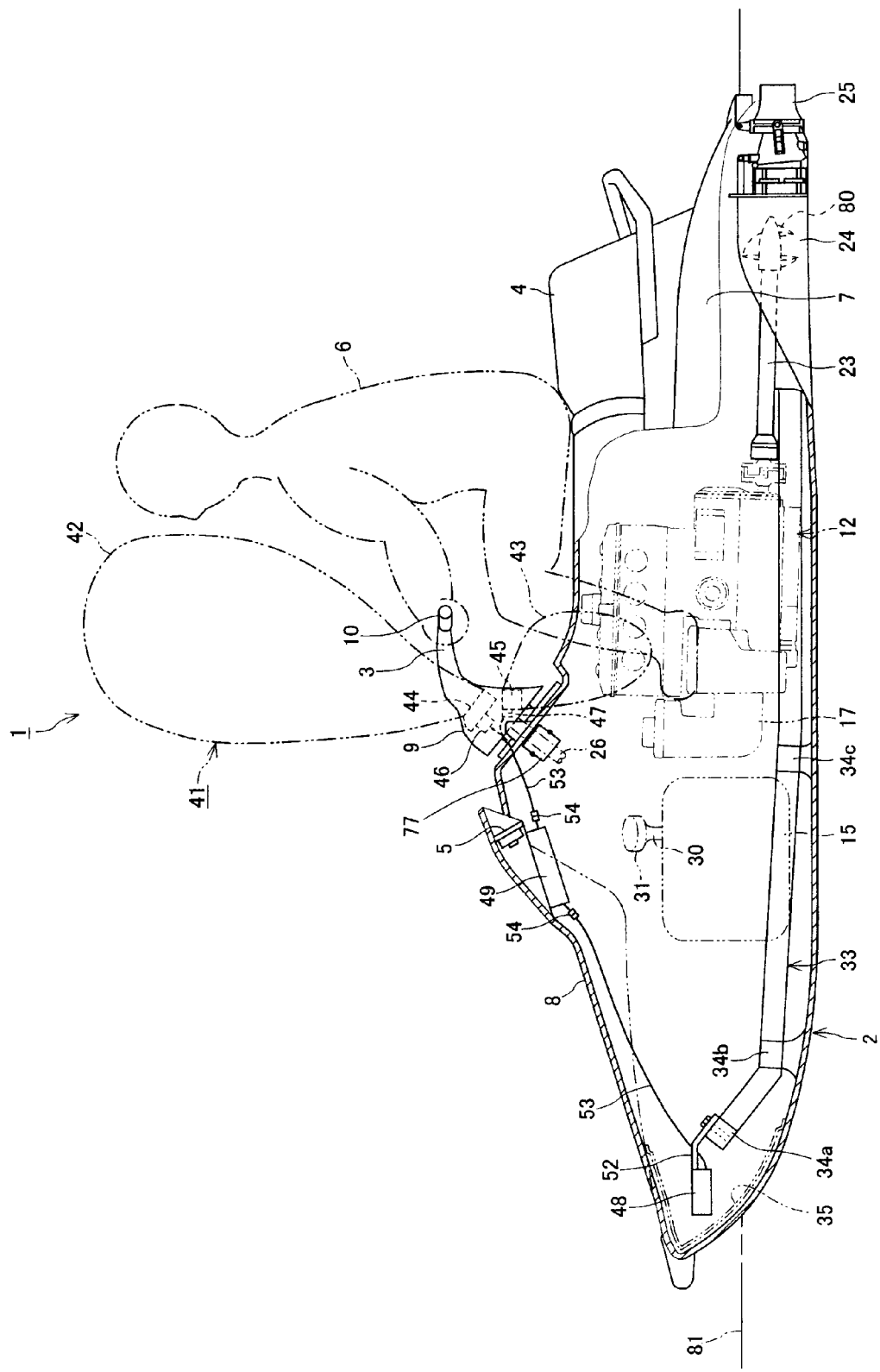
FIG. 3 is a left-side longitudinal sectional view of a small planing boat according to the first embodiment.
Figure 4:
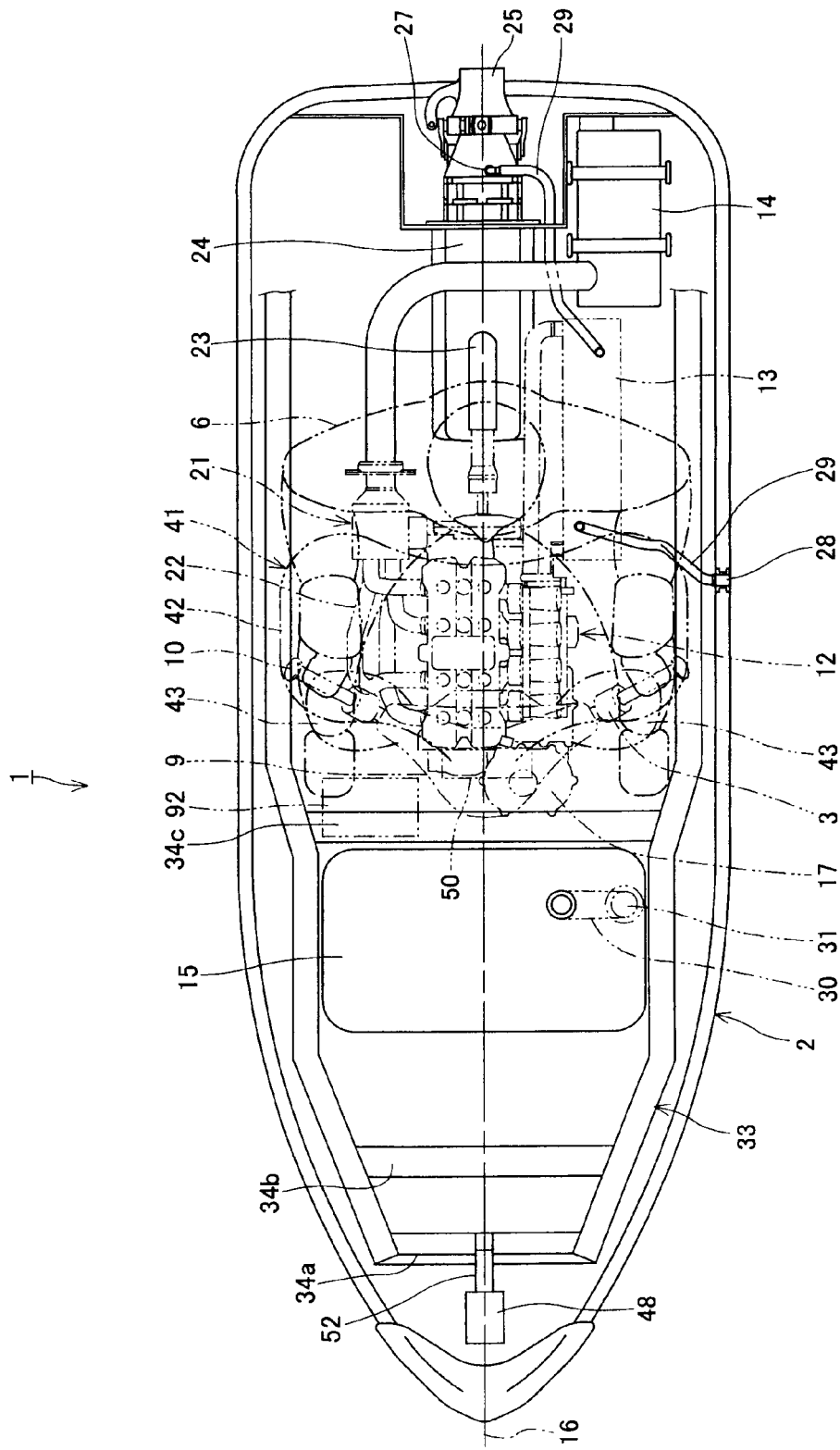
FIG. 4 is a longitudinal sectional plan view of the small planing boat according to the first embodiment.
Figure 5:
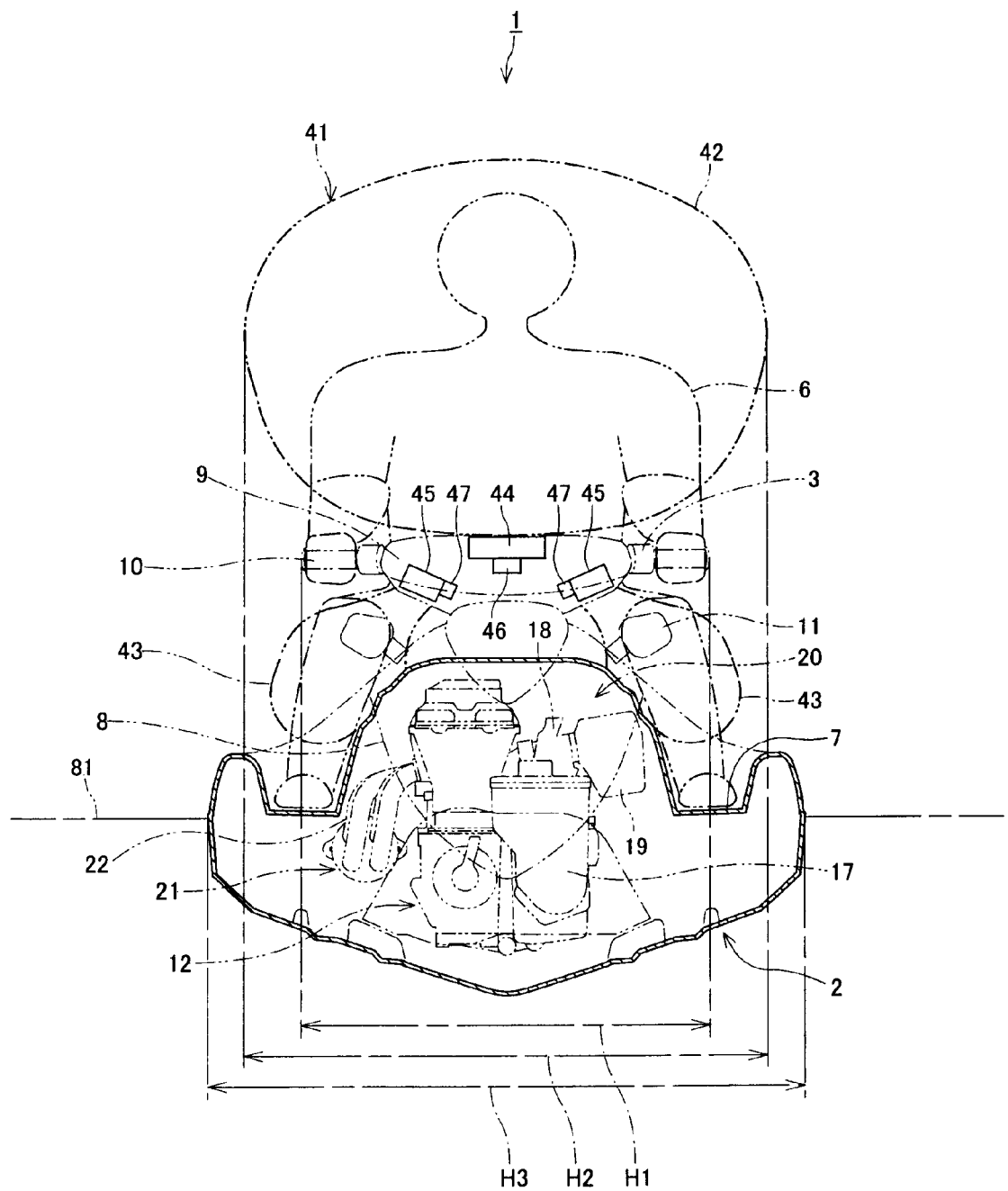
FIG. 5 is a sectional front view of the small planing boat according to the first embodiment.

The front half of the small planing boat 1 is covered with an openable hood 8, and the meter panel 5 is also covered with a portion of the hood 8. The handle bar 3 is covered with a handle cover 9 and has grips 10 on both ends. Rear view mirrors 11 are attached to both sides of the boat body 2 between the handle bar 3 and the meter panel 5 thereof. With reference to FIGS. 3 to 5, the boat body 2 is provided with an engine 12 and auxiliary engine machinery such as a heat exchanger 13, a muffler 14, and a fuel tank 15. The engine 12 is a water-cooled four-stroke-cycle multiple-cylinder engine in which a plurality of upstanding cylinders (four cylinders in this embodiment) are arranged in parallel with the axis 16 of the boat body 2 in its advancing (longitudinal) direction and is mounted below the driving seat 4 substantially at the central portion of the boat body 2. The engine 12 employs a dry sump lubrication system in which an oil tank 17 is provided separately in front thereof.

Furthermore, one side end of, for example, an intake system 20 such as a carburetor 18, a fuel injector, and an air cleaner 19 is connected to one end, i.e., left side end, of the engine 12, and on the other hand, an exhaust pipe 22 constituting an exhaust system 21 is connected to the other end, i.e., right side end thereof. The downstream end of the exhaust pipe 22 is connected to the muffler 14 constituting another exhaust system 21 disposed on the rearmost end of the boat body 2.

An impeller shaft 23 extends from the rear side of the engine 12 backwards in parallel with the axis 16 of the boat body so as to penetrate a jet pump 24 provided at the bottom portion of the boat, and an impeller 80 is disposed at the rear end portion thereof. The jet pump 24 has a jet nozzle 25 at the rear end so as to project from the rearmost end of the boat body 2.

When the engine 12 is driven to rotate the impeller shaft 23, the water in the bottom of the boat is sucked by the jet pump 24 through the operation of the impeller 80 and jetted through the jet nozzle 25 backwards. The planing boat 1 moves forwards by the reaction of this jetting, and the jet nozzle 25 is laterally rotatable by the operation of the handle bar 3 supported by a steering shaft 26 so as to be turnable to the right and left, thus freely changing the moving direction of the planing boat 1.

The engine-cooling heat exchanger 13 is disposed behind the intake system 20. The heat exchanger 13 cools the cooling water heated by circulating in the engine 12 with sea water etc. taken from the exterior. An inlet (intake) port 27 for sea water is formed in the vicinity of the jet nozzle 25. An outlet (exhaust) port 28 for sea water is also formed in the port wall of the boat body 2, for example. The heat exchanger 13, the inlet port 27 and the outlet port 28 are communicated together by means of hose 29.

The fuel tank 15 is disposed in the space in front of the engine 12 and covered with the hood 8. An oil passage 30 extends from the upper surface of the fuel tank 15 toward the deck 7 of the boat body 2. An oil filler port 31 opposed to the deck 7 is closed by a cap 32.

Frames 33 extending along the longitudinal direction of the boat body 2 are disposed on both sides of the boat body 2. The frames 33 are connected to each other with bridge members 34a to 34c. The rigidity of the distal end of the boat body 2 is set to be lower than that of the other portions of the boat body 2. An elastic material 35 such as rubber is applied to the inside of the distal end of the boat body 2 so as to form a double structure to thereby provide a waterproof function.

The small planing boat 1 according to the first embodiment of the present invention has an airbag system 41 serving as means for relaxing an impact on the rider 6 at a time of collision. According to this first embodiment, the airbag system 41 principally includes two kinds of waterproof and water-repellent bag-shaped airbag bodies 42 and 43, made of rubber or the like, housings 44 and 45 for accommodating and holding the airbag bodies 42 and 43 in an folded state, inflators 46 and 47 for generating, e.g., high-pressure gas serving as means for inflating the airbag bodies 42 and 43 in the collision of the boat body 2, a G-sensor 48 for sensing the acceleration (G) by the collision of the boat body 2 and determining the activation of the inflators 46 and 47, and a controller 49 for controlling the G-sensor 48 and the inflation of the airbag bodies 42 and 43.

Although the G-sensor 48 is adopted as a sensor for detecting the collision in this embodiment, it is not limited to such acceleration (G) sensor and any kind of sensor may be utilized for detecting the collision.

The airbag bodies 42 and 43 are provided with housings 44 and 45, respectively, which are disposed in the handle bar 3 at an upper portion of the steering shaft 26 (specifically, inside the handle cover 9 covering the handle bar 3). Further, it is desirable that the controller 49 is disposed apart from a waterline 81 as much as possible.

The housing 44 is disposed at the upper central portion in the handle cover 9 so that one 42 of the airbag bodies 42 and 43 is inflated and blown up from the handle bar 3 to the rear side of the boat body 2 to prevent the collision of the rider 6 against the handle bar 3.

A pair of left and right housings 45 are disposed at lower both sides in the handle cover 9 so that the other airbag bodies 43 expand and blow up toward the front of the knees of the rider 6 to protect the knees of the rider from impact in the collision. A portion of the handle cover 9 directly above the housing 44 and another portion of the handle cover 9 just beside the housings 45 have openings so that the airbag bodies 42 and 43 inflate externally from the boat body 2. The openings are closed by airbag covers 50 and 51 to be closed and opened.

A width H2 of the airbag body 42 in the width direction of the boat body 2 is set to be larger than a width H1 of the handle bar 3 and to be smaller than a width H3 of the boat body 2 (i.e., H1<H2<H3). The airbag bodies 42 and 43 are colored in relatively conspicuous color other than blue and green, for example, yellow or orange. The airbag bodies 42 and 43 may also be coated with a fluorescent paint.

The steering shaft 26 may be divided axially into pieces, and the handle bar 3 and the handle cover 9 can be detached from the boat body 2, with the housings 44 and 45 mounted thereto.

A stay 52 extending forward is detachably mounted to the bridge 34a connecting the front ends of the left and right frames 33. The G-sensor 48 is mounted to the front end of the stay 52 in the front space at the distal end of the boat body 2, which is covered by the hood 8.

The controller 49 is disposed in the vicinity of the meter panel 5 in the space covered by the hood 8, below the meter panel 5 in this embodiment. The G-sensor 48 detects the acceleration along the longitudinal direction of the boat body 2 at the time of collision of the boat body 2 and transmits the acceleration to the controller 49. When the controller 49 determines that the acceleration has exceeded an allowance, the controller 49 generates a driving signal to the inflators 46 and 47 to inflate the airbag bodies 42 and 43.

The controller 49, the G-sensor 48, and the inflators 46 and 47 on the housings 44 and 45 are connected by a harness 53. In the middle of the harness 53, joint members such couplers 54 are provided, by which these members or units are connected so as to be separated from the boat body 2 or partially connected thereto.

Figure 6:
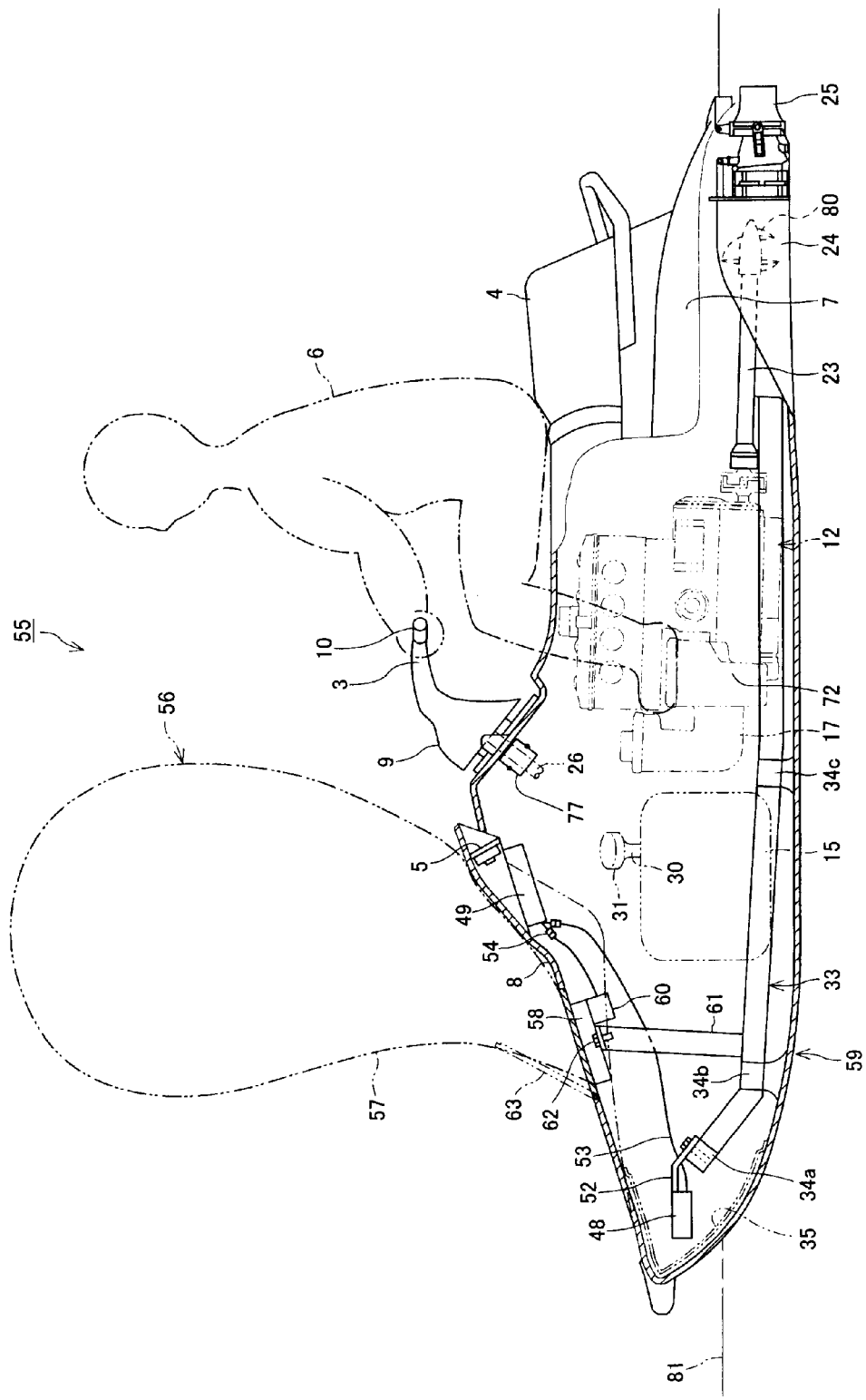
FIG. 6 is a left-side longitudinal sectional view of a small planing boat according to a second embodiment.
Figure 7:
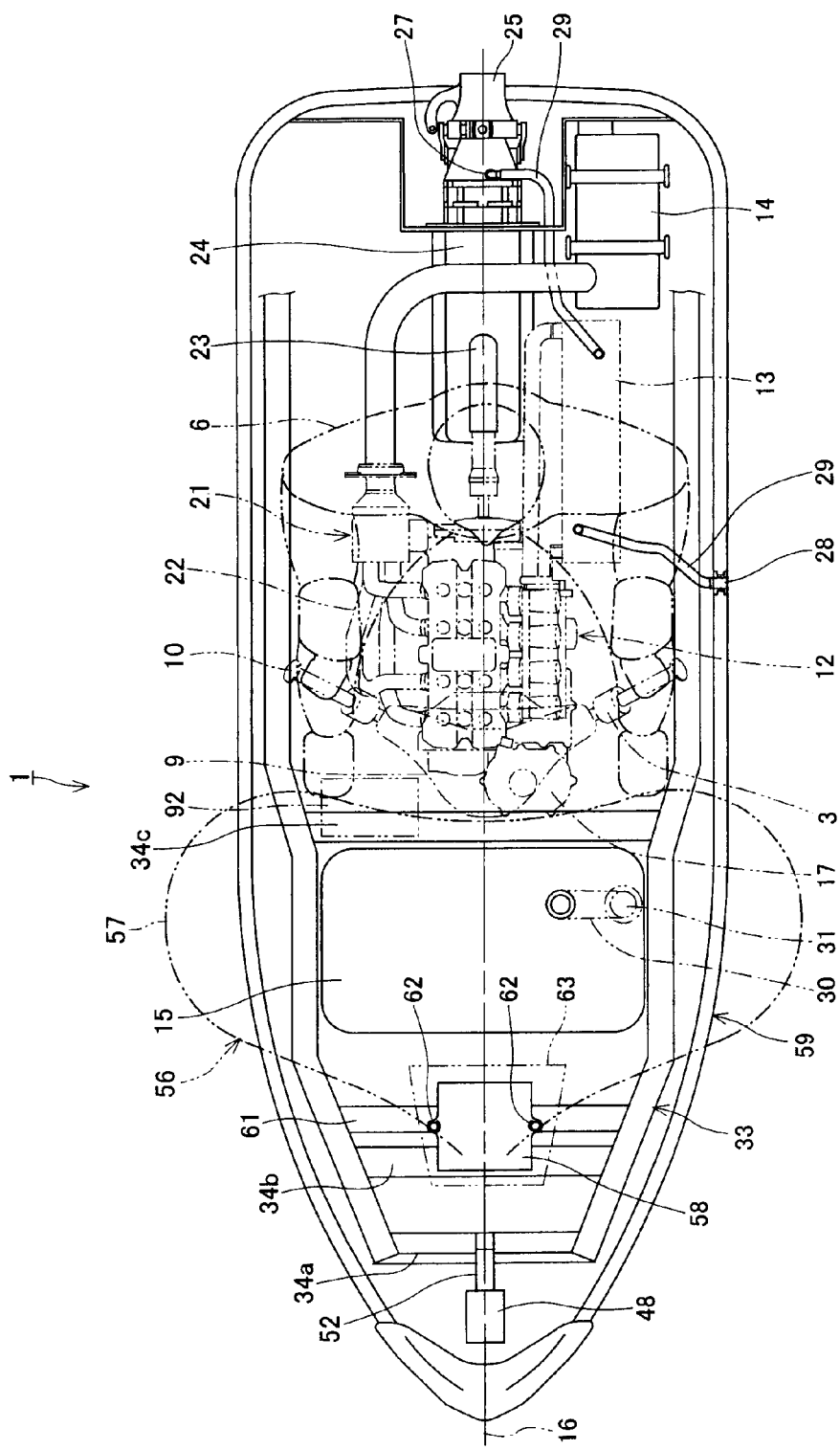
FIG. 7 is a longitudinal sectional plan view of the small planing boat according to the second embodiment.
Figure 8:
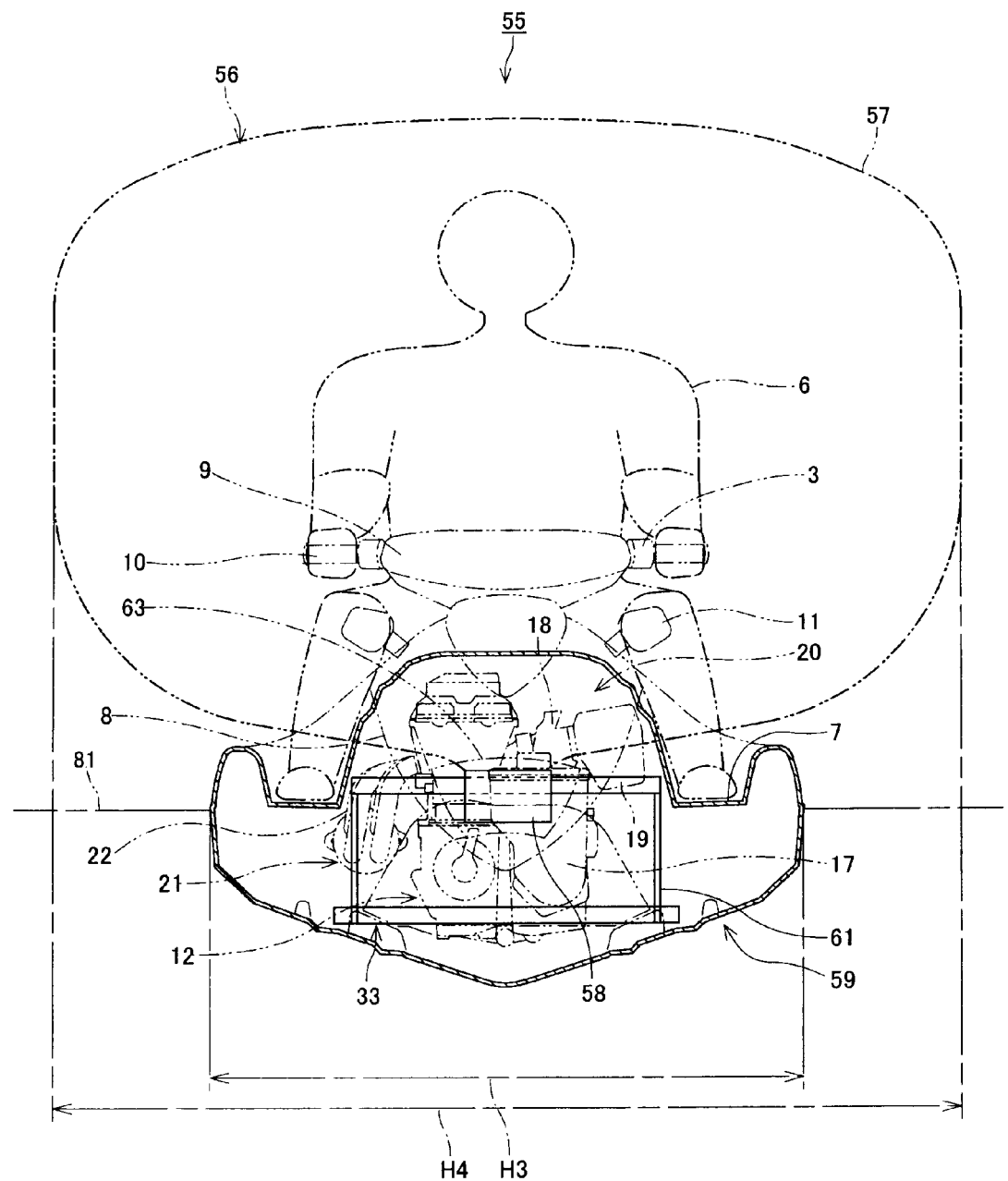
FIG. 8 is a sectional front view of the small planing boat according to the second embodiment.

FIGS. 6 to 8 show a small planing boat 55 according to the second embodiment of the invention. The basic structure of the planing boat 55 of this second embodiment is the same as that of the planing boat 1 of the first embodiment. Accordingly, the same reference numerals are added to the same or like components or elements of this second embodiment and the detailed description thereof is omitted herein.

As shown in FIGS. 6 to 8, an airbag system 56 provided for the planing boat 55 of this embodiment also includes a bag-shaped airbag body 57, made of rubber or the like, a housing 58 for accommodating the airbag body 57 in an folded state, an inflator 60 for generating, e.g., high-pressure gas serving as means for inflating the airbag body 57 at the time of collision of a boat body 59, the G-sensor 48 for sensing the acceleration (G) by the collision of the boat body 59 and determining the activation of the inflator 60, and the controller 49 for controlling the G-sensor 48 and the inflation or blowing-up of the airbag body 57. The sensor for detecting a collision is not limited to the G-sensor 48, but any kind of sensor detecting the collision may be adopted such as in the first embodiment.

A support frame 61 extending toward the lower surface of the hood 8 is provided in the vicinity of the distal end, desirably, behind the distal (front) end, between the left and right frames 33 under the hood 8 and in front of the fuel tank 15 in the front space covered with the hood 8 and in front of the engine 12. The housing 58 for accommodating the airbag body 57 is detachably mounted on the upper surface of the support frame 61 with fixtures such as screws 62. The inflator 60 is mounted to the lower surface of the housing 58, for example.

The hood 8 directly above the housing 58 is opened so that the airbag body 57 can blow up outside the boat body 59. The opening is closed by an airbag cover 63 to be openable by the airbag cover 63. The airbag body 57 blows up toward the meter panel 5 by utilizing a slop, as a guide, being a portion of the hood 8 covering the upper portion of the meter panel 5, thereby preventing the rider 6 from being thrown forwards when colliding. A width H4 of the airbag body 57 along the width of the boat body 59 is set larger than the width H3 of the boat body 59 (i.e., H3<H4). The airbag body 57 is colored in relatively conspicuous color other than blue and green, for example, yellow or orange. The airbag body 57 may also be coated with a fluorescent paint.

The stay 52 extending forward is detachably mounted to the bridges 34a to 34c connecting the ends of the left and right frames 33 in front of the housing 58. The G-sensor 48 is mounted to the front end of the stay 52 in the front space at the distal end of the boat body 59, which is covered by the hood 8. Because it is desired that the controller is disposed to be apart from the waterline 81 as much as possible, the controller 49 is disposed in the vicinity of the meter panel 5 in the space covered by the hood 8, below the meter panel 5 in this embodiment.

The controller 49, the G-sensor 48, and the inflator 60 on the housing 58 are connected by the harness 53. In the middle of the harness 53, joint members such couplers 54 are provided, with which the units are disconnectably connected to be separated from or partly connected to the boat body 59, as in the first embodiment.

Figure 9:
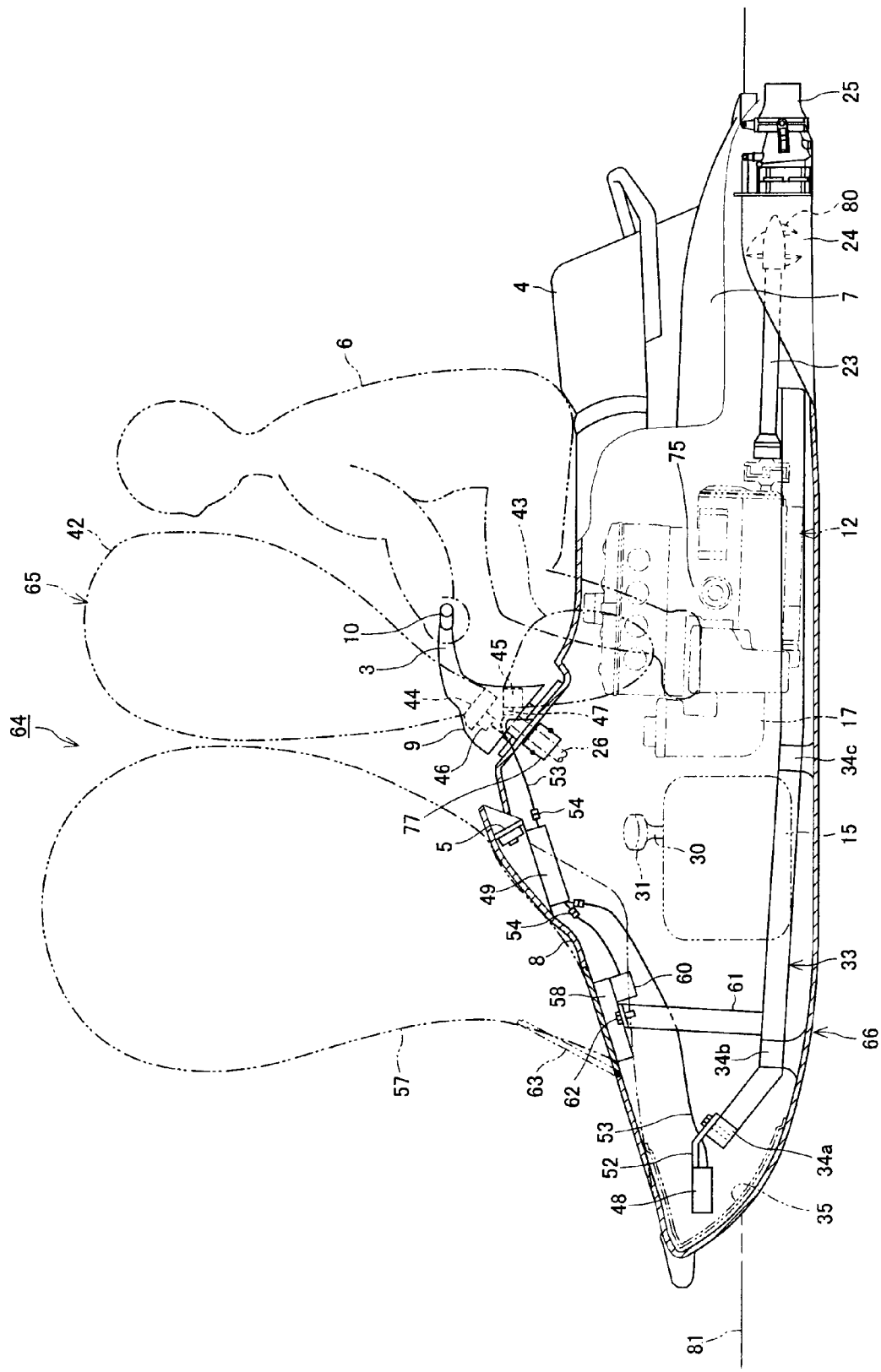
FIG. 9 is a left-side longitudinal sectional view of a small planing boat according to a third embodiment.
Figure 10:
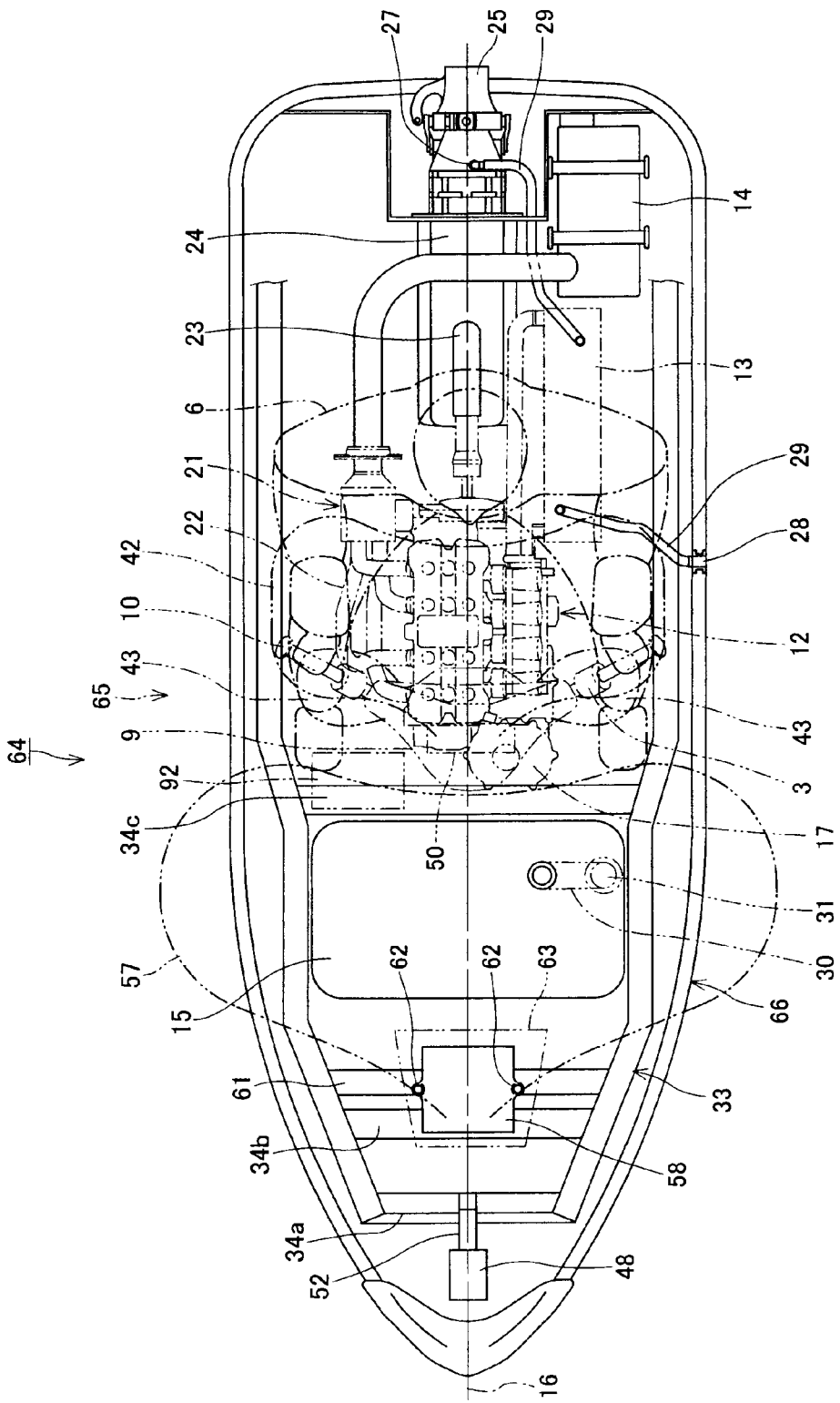
FIG. 10 is a longitudinal sectional plan view of the small planing boat according to the third embodiment.
Figure 11:
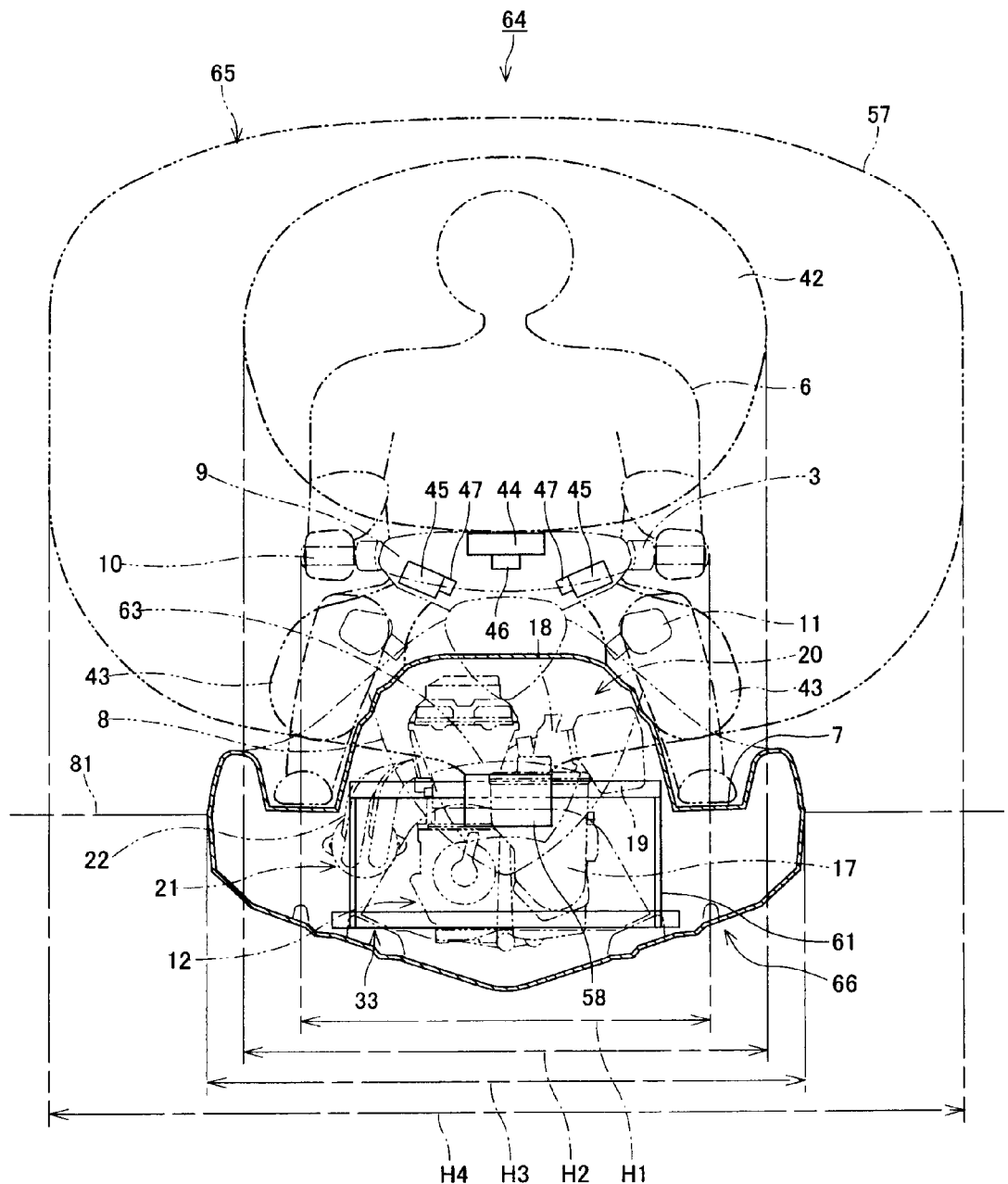
FIG. 11 is a sectional front view of the small planing boat according to the third embodiment.

FIGS. 9 to 11 show a small planing boat 64 according to a third embodiment of the invention. The basic structure of the planing boat 64 according to the third embodiment is the same as that of the planing boat 1 according to the first embodiment. Accordingly, the same components are given the same reference numerals and their description will be omitted.

As shown in FIGS. 9 to 11, an airbag system 65 provided to a planing boat 64 is equipped with both of the airbag system 41 according to the first embodiment and the airbag system 56 according to the second embodiment.

Specifically, the airbag system 65 includes the airbag body 42 disposed at the upper central portion in the handle cover 9, for preventing the collision of the rider 6 against the handle bar 3 by blowing up from the handle bar 3 to the rear of a boat body 66 at the time of collision, the airbag bodies 43 disposed on both sides of the lower portion in the handle cover 9 and blowing up toward the front of the knees of the rider 6 to protect the knees in the collision, and the airbag body 57 disposed under the hood 8 and blowing up toward the meter panel 5, for preventing the rider 6 from being thrown forwards at the time of collision. Since the controller 49, the G-sensor 48, the harness 53, the coupler 54, etc. are common to those in the former embodiments, their description will be omitted here. The G-sensor 48 is also the same as that in the first or second embodiment, and any kind of sensor detecting a collision may be employed.

It is not necessarily for all the airbag bodies 42, 43, and 57 to be activated at the same time and they may be set to be activated separately or synchronously as occasion demands or depending on situations such as magnitude of the collision. For example, only the airbag bodies 42 and 43 disposed in the vicinity of the handle bar 3 may be blown up separately at the time of a small collision, and all the airbag bodies 42, 43, and 57 may be blown up at the same time in a large collision. Further, in the former example, the airbag body 57 disposed under the hood 8 may be blown up with a time lag relative to the airbag bodies 42 and 43 disposed in the vicinity of the handle bar 3, and in other words, the timing of blowing up of the airbag body 57 disposed under the hood 8 may be delayed from the timing of blowing up of the airbag bodies 42 and 43 disposed in the vicinity of the handle bar 3.

At that time, the G-sensor 48 and the controller 49 for controlling the blowing-up of the airbag bodies 42, 43, and 57 may be operated in two systems in which the airbag bodies 42 and 43 disposed in the vicinity of the handle bar 3 and the airbag body 57 disposed under the hood 8 are separated from each other, or alternatively, operated in one system in which the timings of the blowing-up of the respective airbag bodies 42, 43, and 57 are controlled by the controller 49.

The width H2 of the airbag body 42 along the width (i.e., lateral direction) of the boat body 66, which is disposed in the upper central portion in the handle cover 9, is set larger than the width H1 of the handle bar 3 and smaller than the width H3 of the boat body 66, and the width H4 of the airbag body 57 disposed under the hood 8 is set larger than the width H3 of the boat body 66 (i.e., H1<H2<H3<H4). The blowing-up area and volume of the airbag body 57 disposed under the hood 8 are made to be wider and higher than those of the airbag body 42 disposed in the upper central portion in the handle cover 9.

Figure 12:
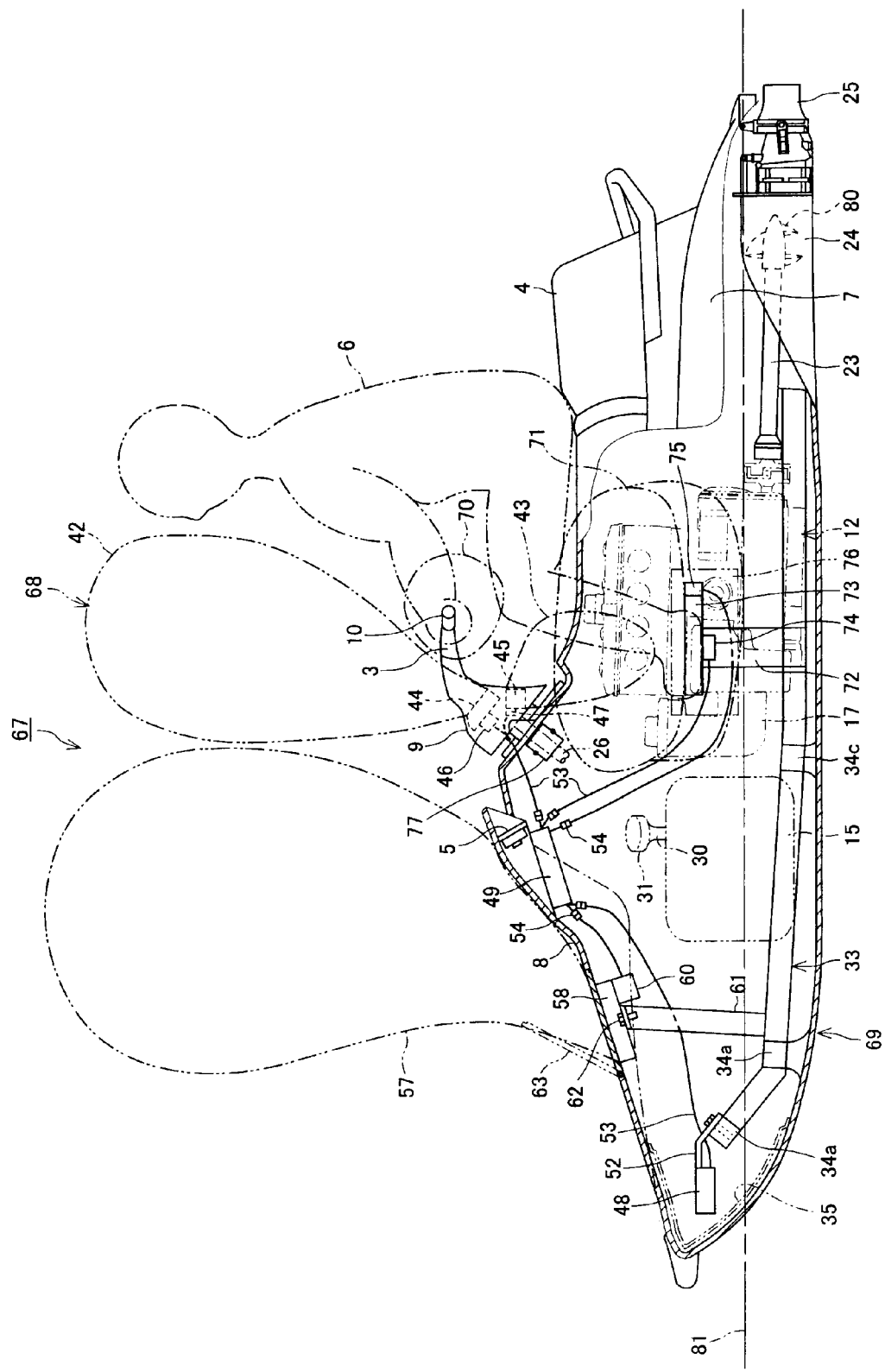
FIG. 12 is a left-side longitudinal sectional view of a small planing boat according to a fourth embodiment.
Figure 13:
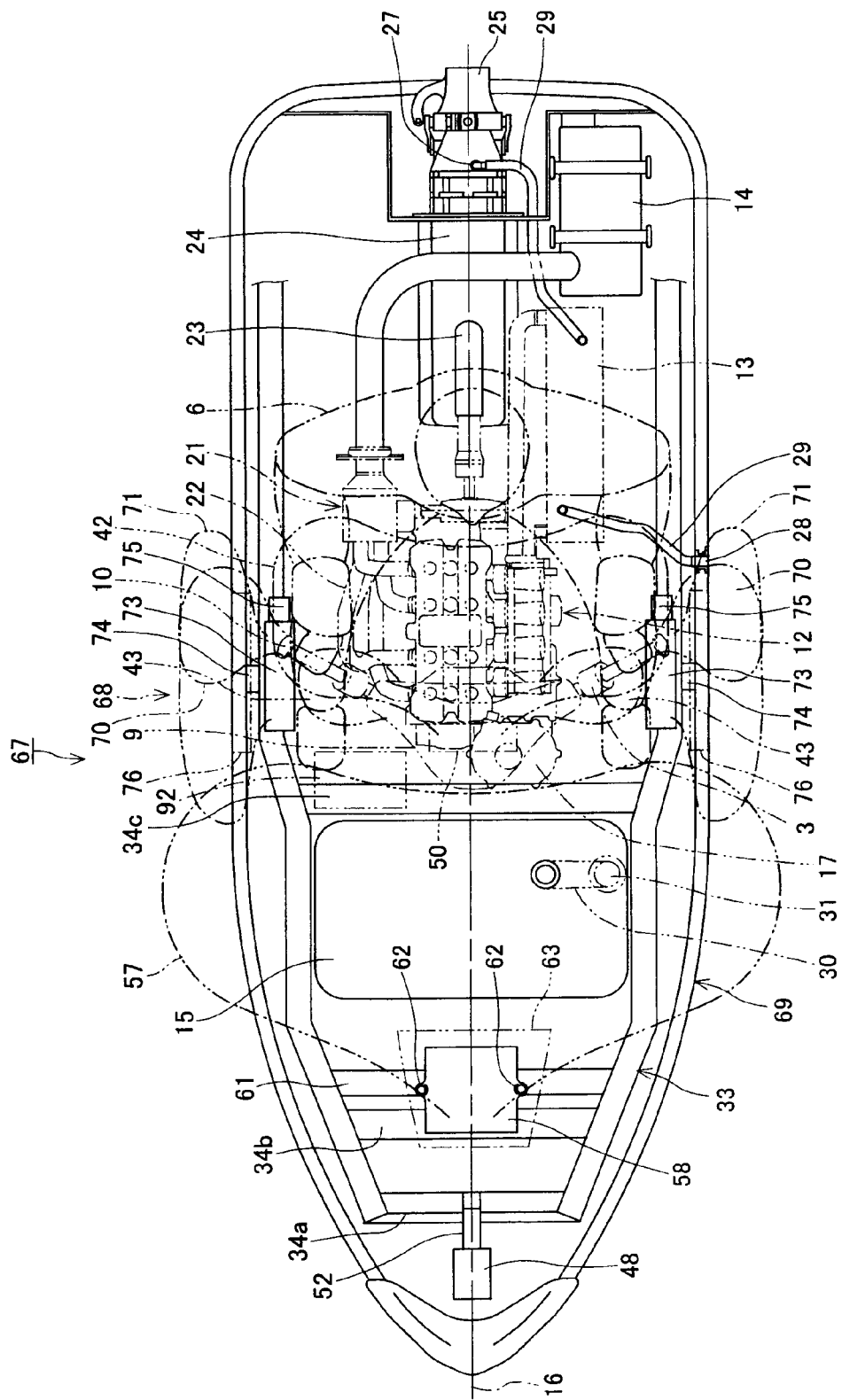
FIG. 13 is a longitudinal sectional plan view of the small planing boat according to the fourth embodiment.
Figure 14:
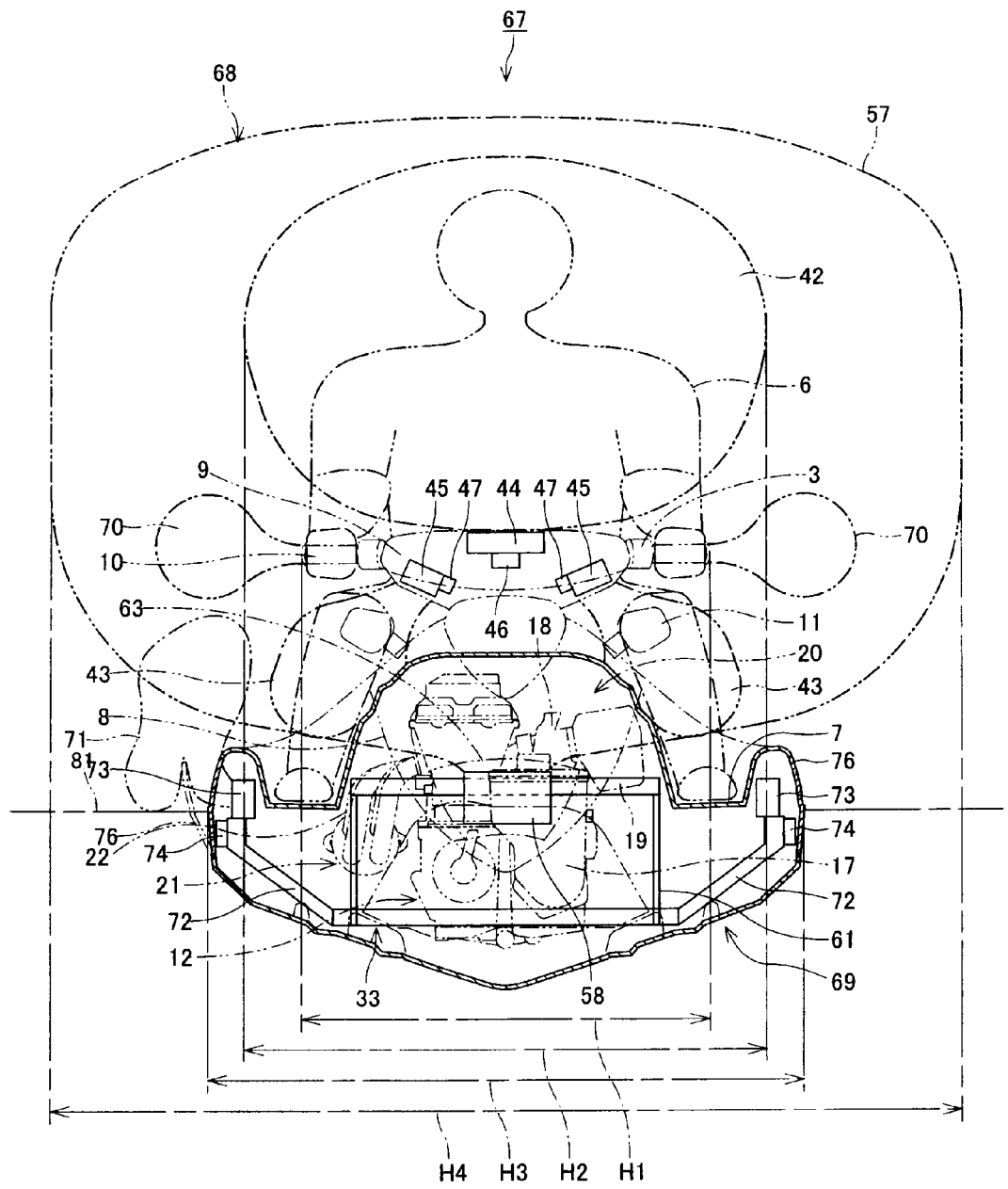
FIG. 14 is a sectional front view of the small planing boat according to the fourth embodiment.

FIGS. 12 to 14 show a small planing boat 67 according to the fourth embodiment of the present invention, and the basic structure of the small planing boat 67 according to this fourth embodiment is the same as that of the small planing boat 1 of the first embodiment.

Accordingly, the same reference numerals are added to the same or corresponding elements or components of this embodiment, and their description will be omitted herein.

As shown in FIGS. 12 to 14, an airbag system 68 provided for a planing boat 67 is equipped with the airbag system 65 according to the third embodiment and also a plurality of airbag bodies for protecting the rider 6 from a side crash.

Specifically, the airbag system 68 includes the airbag body 42 disposed at the upper central portion in the handle cover 9, for preventing the collision of the rider 6 against the handle bar 3 by blowing up from the handle bar 3 to the rear of a boat body 69, the airbag bodies 43 disposed on both sides of the lower portion in the handle cover 9 and blown up toward the front of the knees of the rider 6 to protect the knees when colliding, the airbag body 57 disposed under the hood 8 and blown up toward the meter panel 5, for preventing the rider 6 from being thrown forwards in a collision, a pair of left and right airbag bodies 70 held in the grips 10 at both ends of the handle bar 3 and blow up along the width of the boat body 69, for protecting the side of the rider 6, and a pair of left and right airbag bodies 71 held in both broadsides of the boat body 69 and blow up upwards along the width of the boat body 69 to cover the decks 7 for the feet of the rider 6 as viewed from the side, for protecting the feet of the rider 6.

A pair of left and right support frames 72 extending upwards are provided substantially at the central portion of the left and right frames 33, on which housings 73 accommodating the airbag bodies 71 in a folded state are provided. A G-sensor 74 is provided under each housing 73. An inflator 75 is disposed, e.g., behind each housing 73.

The broadsides of the housings 73 have openings so that the airbag bodies 71 can blow up outside the boat body 69. The openings are each openably closed by an airbag cover 76. Since the controller 49, the G-sensor 48 for the airbag bodies 42, 43, and 57, the harness 53, the coupler 54, etc. are common to the aforementioned embodiments, their description will be omitted herein.

The airbag body 57 is disposed under the hood 8 so as to be contracted, after the blowing-up, at a time to be later than that of the airbag body 42 disposed in the upper central portion in the handle cover 9 or to be hardly contract, or the airbag body 57 disposed under the hood 8 can be set not to be contracted after the blowing-up, thereby providing a condition or state of a mat.

Figure 15:
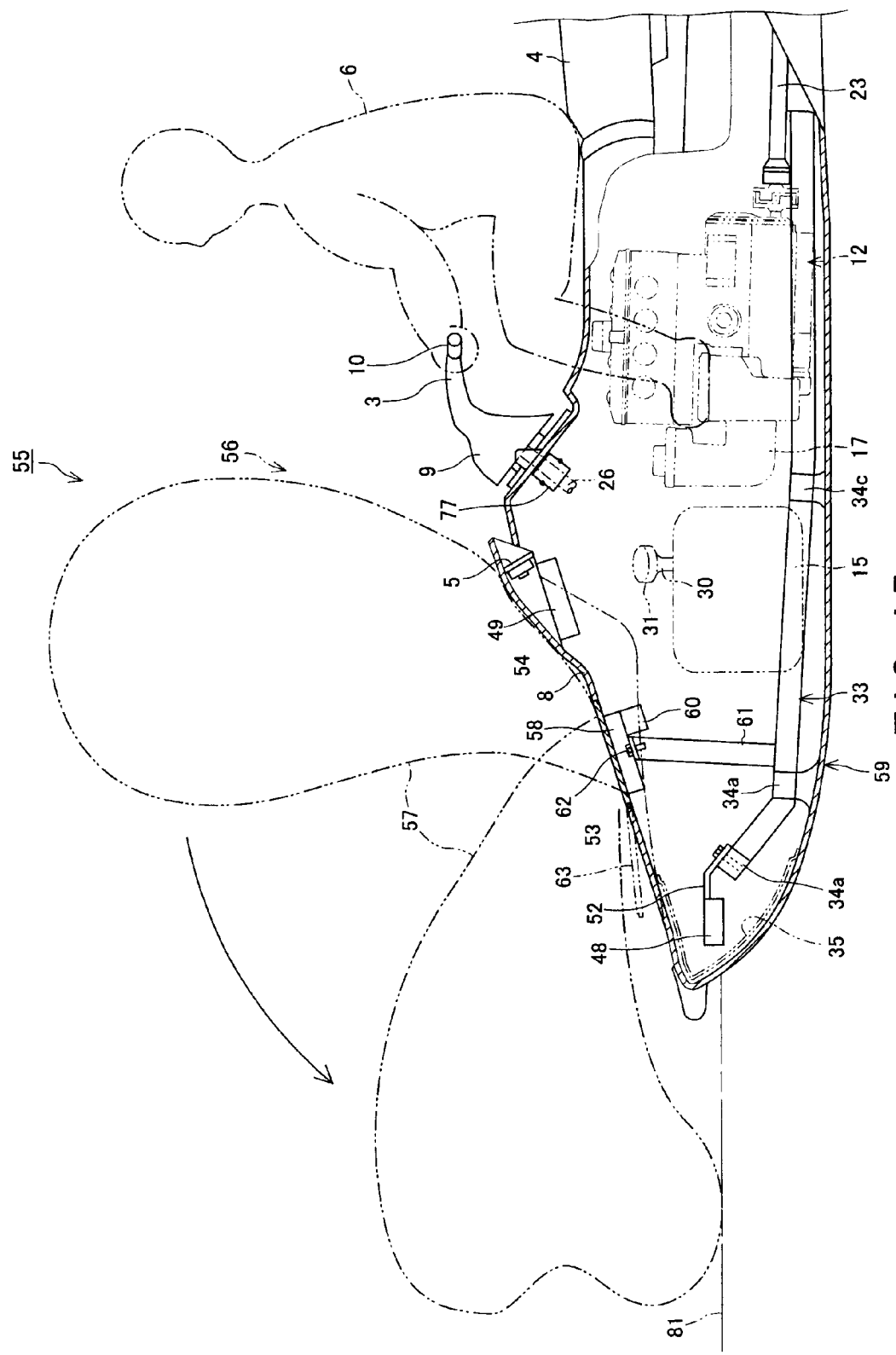
FIG. 15 is a left-side longitudinal sectional view of a small planing boat, in which the airbag body is disposed to the front side of the boat.
Figure 16:
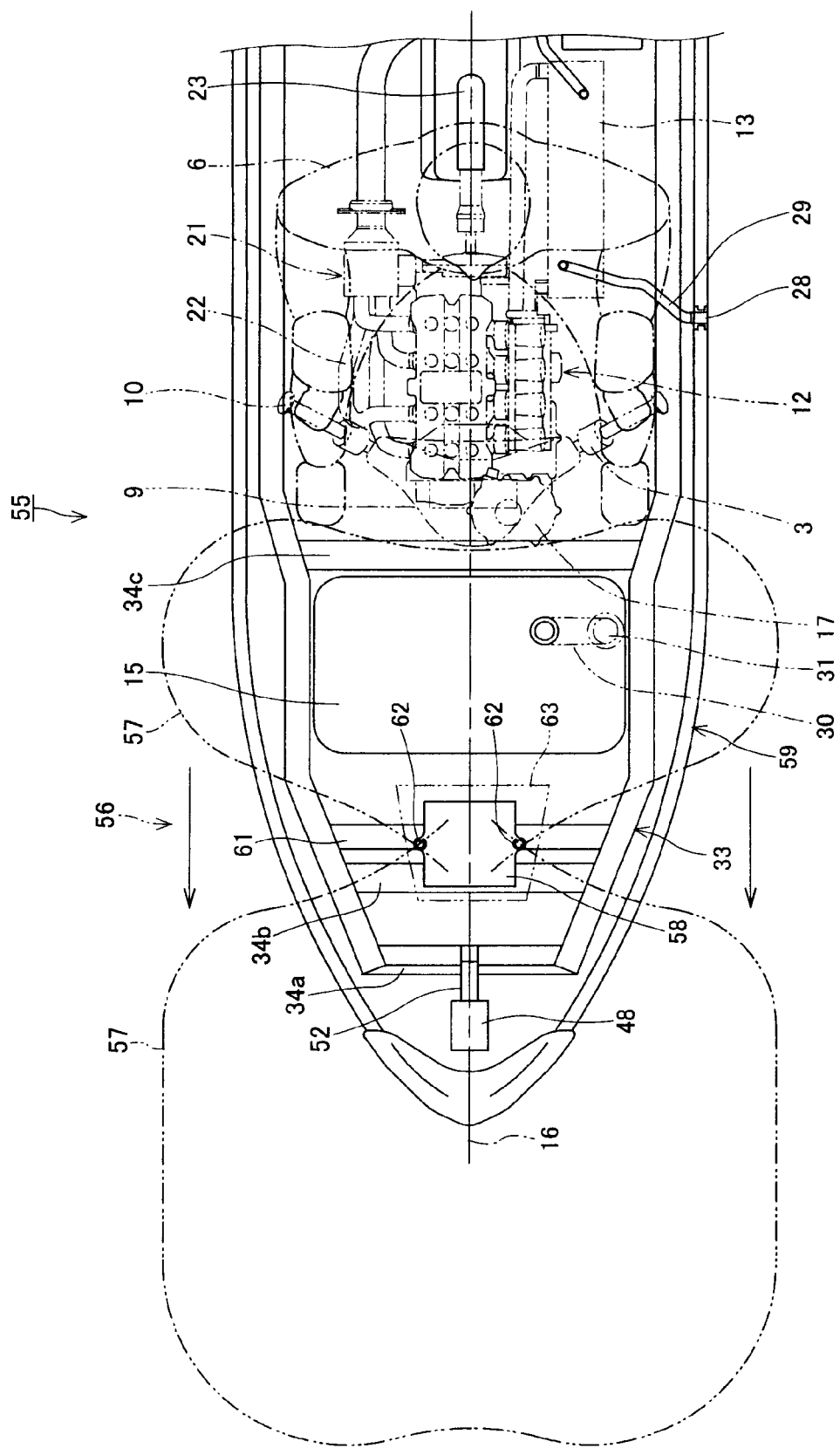
FIG. 16 is a longitudinal sectional plan view of the small planing boat, in which the airbag body is disposed to the front side of the boat.

As shown in FIGS. 15 and 16, when the airbag body 57 disposed under the hood 8 takes a non-contracted state and provides the mat state after the blowing-up, the airbag body 57 can be used as a float (buoy) by moving it to the front side of the boat body 59.

Figure 17:
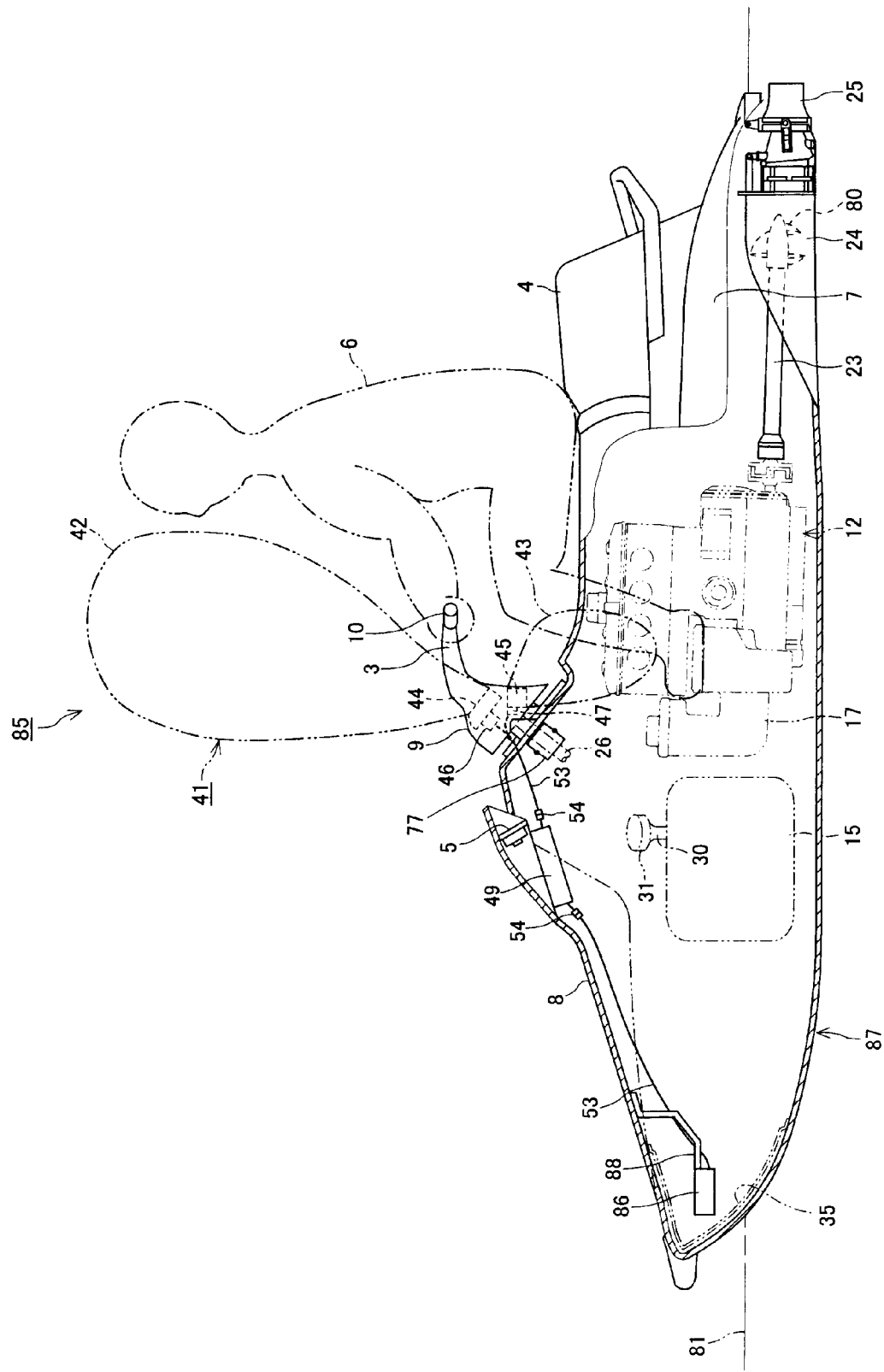
FIG. 17 is a left-side longitudinal sectional view of a small planing boat according to a fifth embodiment.
Figure 18:
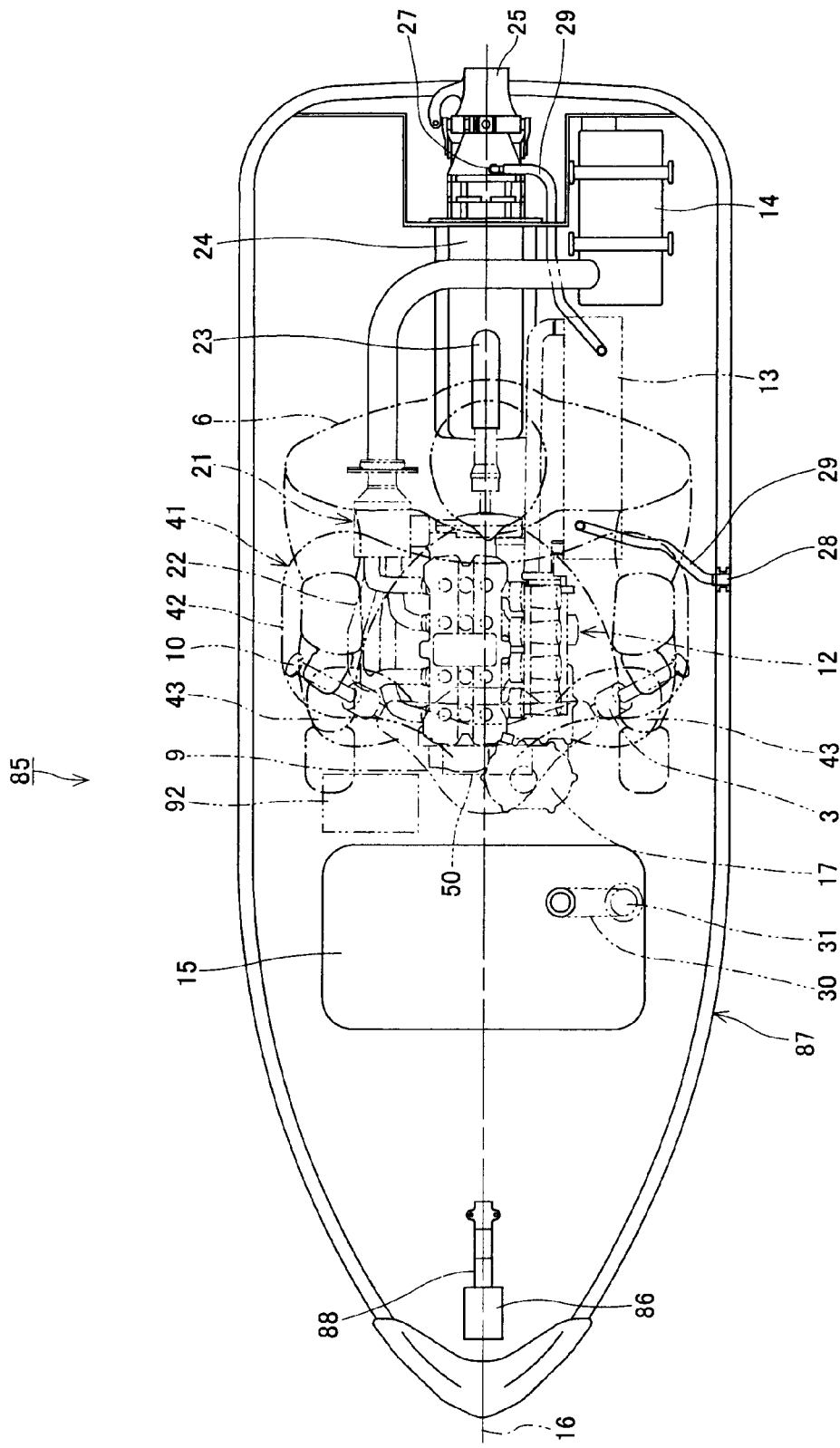
FIG. 18 is a longitudinal sectional plan view of the small planing boat according to the fifth embodiment.

FIGS. 17 and 18 show a small planing boat 85 according to the fifth embodiment of the present invention, and the basic structure of the planing boat 85 according to this fifth embodiment is the same as that of the planing boat 1 of the first embodiment. Accordingly, the same reference numerals are added to the same or corresponding components or elements in this embodiment, and the description thereof is now omitted herein.

As shown in FIGS. 17 and 18, the small planing boat 85 differs from the small planing boat 1 according to the first embodiment in that the planing boat 85 has no frames 33, which are provided to the planing boat 1 of the first embodiment and extend along the longitudinal direction of the boat body 2 on both sides of the bottom portion thereof. Accordingly, a G sensor 86 for detecting a collision can be mounted to the front end of a stay 88 of a boat body 87, which extends from the back of the hood 8 toward the front lower portion.

Incidentally, as a characteristic feature common to all the above embodiments is that the operation of the airbag systems 41, 56, 65, and 68 can be switched to be "ON" or "OFF" to prevent the malfunction thereof due to a small impact that will occur inevitably when the broadside of the boat bodies 2, 59, 66, and 69 strike against a berth when the small planing boats 1, 55, 64, and 67 approach or leave the berth. That is, specifically, there are a method of switching, e.g., an ON/OFF switch 82 (refer to FIG. 2) manually and a method in which the controller 49 has the function of controlling the airbag systems 41, 56, 65, and 68 automatically to be "ON" or "OFF" depending on the speed lower than a specified speed.

It is more convenient to integrate the housings 44, 45, 58, and 73 for holding the airbag bodies 42, 43, 57, 70, and 71 with the inflators 46, 47, 60, and 75, respectively, as a characteristic common to all the above embodiments, because they can easily be replaced or maintained in a cassette state.

Figure 19:
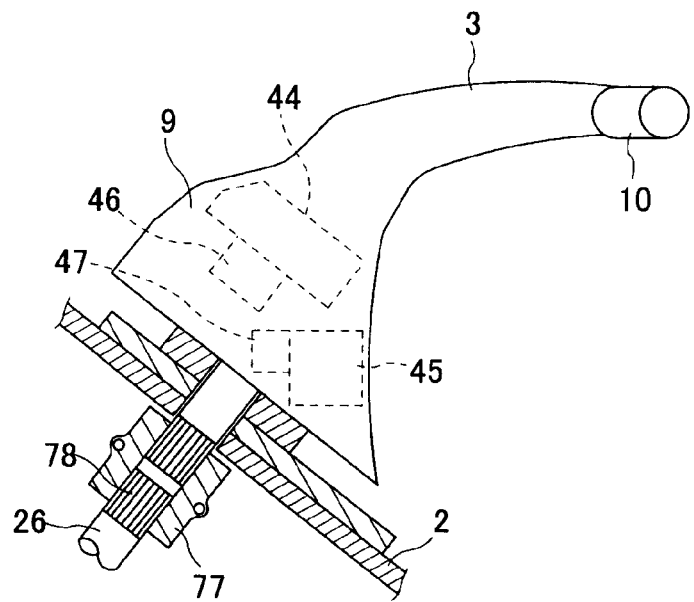
FIG. 19 is a left-side longitudinal sectional view of the divided structure of a steering shaft.

Further, in the foregoing embodiments, the housings 44 and 45 are mounted in the handle cover 9, for example, the steering shaft 26 can be divided axially and as such, the handle bar 3, and the handle cover 9 can be detached from the boat body 2, with the housings 44 and 45 mounted thereto. In the concrete structural example thereof, as shown in FIG. 19, the axially divided pieces of the steering shaft 26 are coupled together with a joint 55, and whirl-stop means such as serrations 78 is disposed so as to stop the whirl, i.e., rotation, of the steering shaft 26 and the joint 77.

Further, it may be desired to dispose the dividing position of the steering shaft 26 outside the boat body 2 when placing high priority on detachability. On the other hand, for waterproofing, it is desirable to dispose the dividing position of the steering shaft 26 in the boat body 2.

Figure 20:
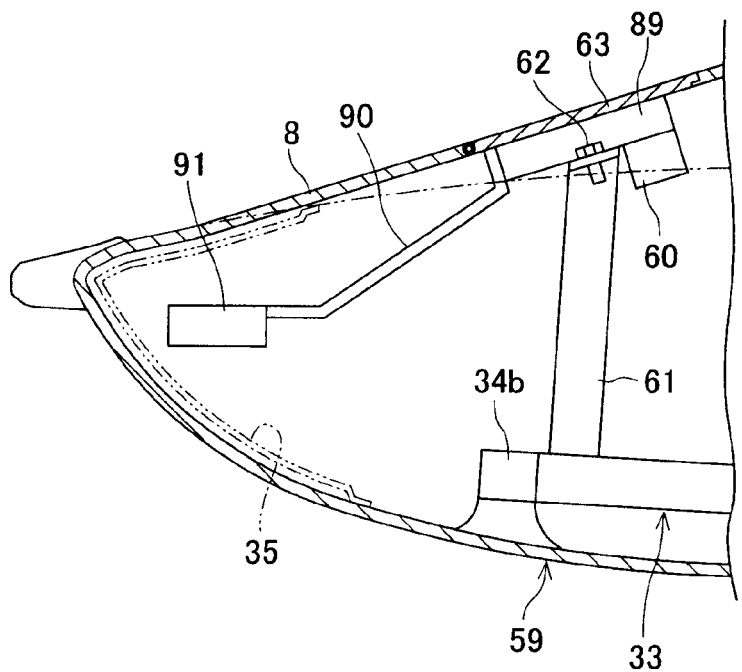
FIG. 20 is a left-side longitudinal sectional view, in an enlarged scale, of the front side space at the distal end of the boat.

Furthermore, in the foregoing embodiments, the housing 58 disposed under the hood 8 and the G-sensor 48 are separately mounted to the frame 33. However, as shown in FIG. 20, it is also possible to provide a stay 90 extending from the front portion of a housing 89 toward the front lower portion, and a G-sensor 91 for sensing a collision is mounted to the front end of the stay 90, thereby integrating the housing 89 and the G-sensor 91.

The operation of the planing boats according to the embodiments will be described hereunder.

When the small planing boats 1, 55, 64, 67, and 85 collides against another boat or obstacle, the G-sensors 48, 74, and 86 detect the longitudinal (or lateral) acceleration of the boat bodies 2, 59, 66, 69, and 87, and at this instance, when the controller 49 determines that the acceleration has exceeded an allowance, it generates a signal to the inflators 46, 47, 60, and 75 to inflate or blow up the airbag bodies 42, 43, 57, 70, and 71 to prevent the rider 6 from striking against the handle bar 3 and the meter panel 5 and prevent the rider 6 from being thrown outside the boat bodies 2, 59, 66, 69, and 87 depending on acceleration, respectively.

In the present invention, it is allowed for the G-sensors 48, 74, and 86 only to detect the collision.

Specifically, the handle cover 9 covering the handle bar 3 at an upper portion of the steering shaft 26 accommodates the airbag body 42 which expands and brows up from the handle bar 3 to the rear side of the boat body 2 and the airbag body 43 which expands and blows up to the front side of the knees of the rider 6. Accordingly, the kinetic energy of the rider 6 can be effectively absorbed on the back side of the handle bar 3 to thereby prevent the collision of the rider 6 against the handle bar 3 and protect the knees of the rider 6.

The airbag body 57 is provided in the front space in front of the engine 12 and covered by the hood 8, the airbag body 57 expanding toward the meter panel 5 by utilizing the portion of the hood 8, which covers the upper part of the meter panel 5, as a guide slop, a the time of collision. Accordingly, the rider 6 is prevented from being thrown forwards depending on the acceleration of the boat body 59. The support frame 61 extending toward the lower surface of the hood 8 is provided in the vicinity of the distal ends of the frames 33, on which the housing 58 of the airbag body 57 is provided under the hood 8. Accordingly, the housing 58 can be disposed in a position of a level higher than the waterline 81, allowing the influence of water to be prevented and facilitating the maintenance and detachment of the airbag system 56 from outside the boat body 59. This also prevents the influence of water on the controller 49 as an electronic device.

The pair of left and right airbag bodies 70 which blow up along the width of the boat body 69 are accommodated in the grips 10 at both ends of the handle bar 3. Accordingly, an impact on the rider 6 by a collision applied against the side portion of the boat can be relaxed as like as the side airbag of a four-wheel car. The airbag bodies 71 which blow up upward along the width of the boat body 69 to cover the rider's feet decks 7 in a side view are provided in both broadsides of the boat body 69. Accordingly, the normally bare legs of the rider 6 can be protected from the impact of the side collision.

The planing boats 1, 55, 64, 67, and 85 are generally used in a summer season and are left for a long time in, for example, a winter season. Furthermore, the boats are sometimes left for a long time under a bad environment such as outdoors. The airbag systems 41, 56, 65, and 68 can easily be dismounted from the boat bodies 2, 59, 66, 69, and 87 and stored in a good environment when the planing boats 1, 55, 64, 67, and 85 are out of use. Thus, the functions of the airbag systems 41, 56, 65, and 68 can be maintained in good conditions all the time.

When the airbag systems 41, 56, 65, and 68, in a set with a portion of the boat bodies 2, 59, 66, 69, and 87, can be dismounted from the boat bodies 2, 59, 66, 69, and 87, or specifically, the handle bar 3 and the handle cover 9, in a set with the accommodation housings 44 and 45 being mounted, can be dismounted from the boat body 2, the airbag systems 41, 56, 65, and 68 can be dismounted in a unit basis (in a module basis). Accordingly, the airbag systems 41, 56, 65, and 68 can easily be dismounted from the boat bodies 2, 59, 66, 69, and 87 for storage when the planing boats 1, 55, 64, 67, and 85 are out of use. Further, these airbag systems may of course be dismounted separately.

With the structure in which the housings 44, 45, 58, 73, and 89 of the airbag systems 41, 56, 65, and 68 can easily be dismounted from the boat bodies 2, 59, 66, 69, and 87, in a case that the planing boats 1, 55, 64, 67, and 85 is received with a collision and the airbag systems 41, 56, 65, and 68 are activated, if the boat bodies 2, 59, 66, 69, and 87 are still available for traveling, the planing boats 1, 55, 64, 67, and 85 can easily be restored to driving on their own power by easily handling (dismounting) the airbag systems 41, 56, 65, and 68. In this case, it will be more convenient that the inflators 46, 47, 60, and 75 are constructed to be integral with the housings 44, 45, 58, 73, and 89, respectively.

The G-sensor 48 serving as means for sensing acceleration is disposed in the front space at the distal end of the boat body 2 which is covered with the hood 8. Accordingly, the G-sensor 48 can be protected from water, salt, fur, ice, etc. In addition, with the structure in which the G-sensor 48 is mounted detachably to the boat body 2, the G-sensor 48 can easily be dismounted for storage at the time when the boat body 2 is left unused for a long time or at night, and hence, the malfunction of the G-sensor 48 can be prevented from causing and the durability thereof can be improved.

The stay 90 extending from the front portion of the housing 89 toward the front lower side is provided, to the front end of which the G-sensor 91 for detecting acceleration is mounted to integrate the housing 89 and the G-sensor 91 together. Thus, the detachability in a unit basis (module basis), can be improved, hence, facilitating maintenance and dismounting of such equipments.

For the airbag system 65 including a plurality of airbag bodies 42, 43, and 53, when the airbag bodies 42, 43, and 53 are set to be activated separately or cooperatively depending on the severity or magnitude of the collision, even if the airbag system 41 is activated in a small collision, the airbag system 41 can easily be dismounted when the boat body 2 is available for traveling, thus facilitating restoration to traveling on its own power. Furthermore, the labor and cost for replacing the activated airbag system 41 can be reduced.

Since the timing of expansion or blowing-up of the airbag body 57 disposed under the hood 8 is delayed from the timing of blowing-up of the airbag body 42 disposed in the vicinity of the handle bar 3, a two-step countermeasure will be made possible, in which the airbag body 42 disposed in the vicinity of the handle bar 3 first absorbs an impact on the rider 6 due to the collision, and the airbag body 57 disposed under the hood 8 then protects the rider 6.

Since the rider 6 is not always positioned just in front of the boat body 2, when the blowing-up area of the airbag body 57 disposed under the hood 8 is set to be wider than that of the airbag body 42 disposed in the vicinity of the handle bar 3, the probability of capturing the rider 6 will be increased.

Even if the planing boats 1, 55, 64, 67, and 85, which plane on water, are received with a collision and the boats become an unavailable condition or it becomes impossible for the rider 6 to manage the boats, the airbag bodies 42, 43, 57, 70, and 71, which are colored in relatively conspicuous color other than blue and green, for example, yellow or orange, have high viewability, thus easily discovering the boat bodies 2, 59, 66, 69, and 87 and promptly rescuing the rider 6 by another person because of such viewable coloring.

Furthermore, in the structure in which the airbag body 57 disposed under the hood 8 is brought into a mat state without contraction after the blowing-up, the airbag body 57 can be utilized as a cushion for the rider 6 and kinetic energy thereof can be absorbed by the airbag body 42 disposed in the vicinity of the handle bar 3, and the airbag body 57 can also be used as a float (buoy) to prevent the boat body 59 from sinking under water after the collision, and in such case, the rider 6 can use the airbag body 57 as a rescue float.

The width H2 of the airbag body 42 along the width of the boat body 66, which is disposed in the upper central portion in the handle cover 9, is set to be larger than the width H1 of the handle bar 3 and smaller than the width H3 of the boat body 2. The width H4 of the airbag body 57 disposed under the hood 8 is set to be larger than the width H3 of the boat body 66. The volume of the airbag body 57 disposed under the hood 8 is set to be larger than the volume of the airbag body 42 disposed at the upper central portion in the handle cover 9. Such dimensional arrangement makes it possible to increase the probability of capturing the rider 6 and, thereby, prevent the rider 6 from striking against the hood 8 when the boat body 66 collides with another one or like.

In the examples of the above-mentioned embodiments, the inflators 46, 47, 60, and 75 using high-pressure gas are used as means for expanding and inflating (i.e., blowing up) the airbag bodies 42, 43, 57, 70, and 71. Alternatively, an inflator using explosive or an electrically blowing-up inflator may be used. A supply source for stating the activation or operation of the airbag systems 41, 56, 65, and 68 may be either a general battery 92 or the generator of the engine 12.

It may be required for the two-stroke-cycle engines to have large chambers for exhaust with high heat, and this causes limitations in layout when the airbag systems 41, 56, 65, and 68 employing high-pressure gas or explosive for the inflators 46, 47, 60, and 75 are disposed in the boat bodies 2, 59, 66, 69, and 87 with a two-stroke-cycle engine.

On the other hand, the use of a four-stroke-cycle engine 12 increases the flexibility of layout of the airbag systems 41, 56, 65, and 68 as compared with those with the two-stroke-cycle engine.

Even with the four-stroke-cycle engine 12, some heat is generated, that is, for example, the dry-sump oil tank 17, the exhaust pipe 22, and the muffler 14 generate heat. Accordingly, when the engine 12 is disposed under the rider driving seat 4 substantially at the central portion of the boat body 2 and the auxiliary engine machinery such as the fuel tank 15 is disposed in the boat body 2, a space remote from such heat source can be formed at the portion or part in front of the engine 12 and covered with the hood 8, making it possible to provide the space for the airbag system 56.

In the foregoing embodiments, the engine 12 employs a dry sump lubrication system with a separate oil tank 17. The engine 12 may, however, employ a general wet sump lubrication system without oil tank 17 as separate component.

Incidentally, a wet-bike type small planing boat generally has no frame 33. However, when the airbag system 56 is disposed in the front central portion of the boat body 59, it is advantageous to provide the frames 33 to protect the airbag system 56 from the deformation of the boat body 59 at the time of collision. In this case, it is desirable for the frames 33 to have rigidity. In the case where the G-sensor 48 for detecting the collision of the boat body 59 is disposed behind the front end of the frames 33, there is a case that the boat body 59 cannot work effectively.

However, according to the present invention, when the planing boats 1, 55, 64, 67, and 85 themselves have some rigidity and the airbag bodies 42 and 43 are disposed in the handle cover 9, which is hardly influenced by the deformation of the boats, it is not always necessary to dispose the frames 33 (refer to the fifth embodiment). That is, it is important for the boat to have a structure such that the deformation of the boat gives no effect on the activation of the airbag body.

On the other hand, in the structure in which the housing 58 for accommodating and holding the airbag body 57 is disposed ahead of the front end portions of the frames 33, the housing 58 may be deformed by the impact of the collision, which interferes with the activation of the airbag. Accordingly, when the G-sensor 48 is disposed in front of the end portions of the frames 33, and the housing 58 is disposed behind the front end portions of the frames 33, or when the end portions of the frames 33 are positioned between the G-sensor 48 and the housing 58, the above defective matters can be overcome and solved.

Furthermore, in the structure in which the rigidity of the distal ends of the boat bodies 2, 59, 66, 69, and 87 are set to be lower than that of the other parts of the boat bodies 2, 59, 66, 69, and 87, the distal ends of the boat bodies 2, 59, 66, 69, and 87 are endowed with an impact absorbing function, providing effective protective function to the rider 6, in association with the functions of the airbag systems 41, 56, 65, and 68. In addition, since the inside of the distal end of the boat body 2 is coated with the elastic material 35 such as rubber to form a double structure and render it waterproof, the boat bodies 2, 59, 66, 69, and 87 can be prevented from invading of water even if the distal ends of the boat bodies 2, 59, 66, 69, and 87 absorb the impact and then are deformed.

Still furthermore, the airbag bodies 42, 43, 57, 70, and 71 are made of a waterproof and water-repellent material such as rubber, the blowing-up of the airbag bodies 42, 43, 57, 70, and 71 cannot be hindered by water. Moreover, since the expanded airbag bodies 42, 43, 57, 70, and 71 do not absorb water or contain no water therein, it is easy to handle the expanded airbag systems 41, 56, 65, and 68, taking no long time to restore the traveling on their own power, thus being advantageous. In addition, the rubber material is easy to reproduce, has elasticity, and is easy to handle in water.

It is further to be noted that the present invention is not limited to the described embodiments and many other changes and modifications may be made without departing from the scopes of the appended claims.

What is claimed is:

1. A planing boat with an airbag system comprising:
   a boat body extending in a longitudinal direction of the planing boat;
   an engine mounted in the boat body;
   a steering handle bar supported by a steering shaft at an upper portion of the boat body configured to be turned right and left;
   a handle cover which covers the handle bar;

a hood which covers a front half upper surface of the boat body in front of the handle bar;

a rider driving seat disposed behind the handle bar; and an airbag system including at least one bag-shaped airbag body, a housing which accommodates the airbag body, a detector for detecting a collision of the boat, an expanding unit which inflates or blows up the airbag body at the time of collision of the boat, and a controller for controlling the detector and the inflation of the airbag body, the airbag system including a first airbag body in the handle cover which is blown up from the handle bar to a rear side of the boat and a second airbag body in the handle cover which is blown up toward a front side of knees of a rider, and airbag bodies which are disposed in the grips on both ends of the handle bar so as to be expanded and blown up along the width of the boat body.

2. The planing boat according to claim 1, further comprising a third airbag body in the handle cover which is blown up toward the front side of knees of the rider, wherein the second airbag body and the third airbag body are configured to be expanded laterally rearward from a portion near the handle bar.

3. The planing boat according to claim 1, wherein the detector is mounted to the boat body to be detachable in a set with a portion of the boat body.

4. The planing boat according to claim 1, wherein the airbag body is colored in a color other than blue and green or coated with a fluorescent paint.

5. The planing boat according to claim 1, wherein the engine is a four-stroke-cycle engine.

6. The planing boat according to claim 1, wherein the airbag system includes still further airbag bodies which are disposed in broadsides of the boat body so as to be expanded and blown up upward along the width of the boat body to cover a rider's feet decks in a side view.

7. The planing boat according to claim 1, wherein the airbag system is switched "ON" or "OFF".

8. The planning boar according to claim 1, wherein at least first airbag body, second airbag body of the airbag system, the housing and the airbag expanding unit are mounted to the boat body to be detachable integrally with at least one of the handle bar and associated members therewith.

9. The planing boat according to claim 8, wherein the steering shaft is divided axially into divided pieces which are coupled together with a joint, and a whirl-stopping member is disposed inside the joint and outside the steering shaft so as to stop relative motion between the steering shaft and the joint.

10. The planing boat according to claim 9, wherein the whirl-stopping member is a plurality of serrations.

\* \* \* \* \*